(12) United States Patent
Nori et al.

(10) Patent No.: US 7,853,961 B2
(45) Date of Patent: Dec. 14, 2010

(54) PLATFORM FOR DATA SERVICES ACROSS DISPARATE APPLICATION FRAMEWORKS

(75) Inventors: Anil Kumar Nori, Redmond, WA (US); Sameet H. Agarwal, Redmond, WA (US); Jose A. Blakeley, Redmond, WA (US); Pedro Celis, Redmond, WA (US); Praveen Seshadri, Bellevue, WA (US); Soner Terek, Bellevue, WA (US); Arthur T. Whitten, Redmond, WA (US); Dale Woodford, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1319 days.

(21) Appl. No.: 11/171,905

(22) Filed: Jun. 30, 2005

(65) Prior Publication Data

US 2006/0195476 A1   Aug. 31, 2006

Related U.S. Application Data

(60) Provisional application No. 60/657,556, filed on Feb. 28, 2005.

(51) Int. Cl.
  *G06F 9/44* (2006.01)
  *G06F 17/00* (2006.01)
(52) U.S. Cl. ....................................... 719/328; 707/610
(58) Field of Classification Search ................. 719/310, 719/313, 315, 316, 328, 330; 707/1, 2, 3, 707/4, 5, 10, 100, 103 R, 104.1, 609, 610; 717/100, 146
See application file for complete search history.

(56) References Cited

U.S. PATENT DOCUMENTS

| | | | |
|---|---|---|---|
| 5,449,293 A | 9/1995 | Chang et al. | |
| 5,576,954 A | 11/1996 | Driscoll | |
| 5,627,979 A | 5/1997 | Chang et al. | |
| 5,717,913 A | 2/1998 | Driscoll | |
| 5,724,575 A | 3/1998 | Hoover et al. | |
| 5,765,159 A | 6/1998 | Srinivasan | |
| 5,995,969 A | 11/1999 | Lee et al. | |
| 6,128,624 A | 10/2000 | Papierniak et al. | |
| 6,175,837 B1 | 1/2001 | Sharma et al. | |
| 6,341,277 B1 | 1/2002 | Coden et al. | |
| 6,341,289 B1 | 1/2002 | Burroughs et al. | |
| 6,523,027 B1 * | 2/2003 | Underwood | 707/4 |

(Continued)

FOREIGN PATENT DOCUMENTS

EP        1 457 907 A      9/2004

(Continued)

OTHER PUBLICATIONS

EG OA dated Feb. 11, 2009 for EG Application No. 72/2006, 1 page.

(Continued)

*Primary Examiner*—Van H Nguyen

(57) ABSTRACT

Data management between a common data store and multiple applications of multiple disparate application frameworks. A data storage component is provided that facilitates the storage of data, which data includes structured, semi-structured, and unstructured data. A common data platform interfaces to the data storage component to provide data services accessible by a plurality of disparate application frameworks, which data services allow a corresponding application of the different frameworks to access the data.

16 Claims, 23 Drawing Sheets

U.S. PATENT DOCUMENTS

| | | | |
|---|---|---|---|
| 6,556,983 B1 | 4/2003 | Altschuler et al. | |
| 6,591,275 B1 | 7/2003 | Russell et al. | |
| 6,594,666 B1* | 7/2003 | Biswas et al. | 707/100 |
| 6,601,233 B1* | 7/2003 | Underwood | 717/102 |
| 6,609,128 B1* | 8/2003 | Underwood | 707/10 |
| 6,609,133 B2 | 8/2003 | Ng et al. | |
| 6,633,878 B1* | 10/2003 | Underwood | 707/100 |
| 6,735,593 B1 | 5/2004 | Williams | |
| 6,754,885 B1 | 6/2004 | Dardinski et al. | |
| 6,836,777 B2 | 12/2004 | Holle | |
| 6,847,980 B1 | 1/2005 | Benitez et al. | |
| 7,039,898 B2* | 5/2006 | Shah | 717/107 |
| 7,054,877 B2 | 5/2006 | Dettinger et al. | |
| 7,058,655 B2 | 6/2006 | Goldberg et al. | |
| 7,062,502 B1 | 6/2006 | Kesler | |
| 7,096,216 B2 | 8/2006 | Anonsen | |
| 7,152,228 B2* | 12/2006 | Goodwin | 717/146 |
| 7,158,994 B1 | 1/2007 | Smith et al. | |
| 7,162,721 B2 | 1/2007 | Ali et al. | |
| 7,185,317 B2* | 2/2007 | Fish et al. | 717/121 |
| 7,526,501 B2 | 4/2009 | Albahari et al. | |
| 7,676,493 B2 | 3/2010 | Pizzo et al. | |
| 7,685,561 B2 | 3/2010 | Deem et al. | |
| 2001/0047372 A1 | 11/2001 | Gorelik et al. | |
| 2002/0107840 A1 | 8/2002 | Rishe | |
| 2003/0004964 A1 | 1/2003 | Cameron et al. | |
| 2003/0005019 A1 | 1/2003 | Pabla et al. | |
| 2003/0046266 A1 | 3/2003 | Mullins et al. | |
| 2003/0055808 A1* | 3/2003 | Bhat | 707/1 |
| 2003/0105732 A1 | 6/2003 | Kagalwala et al. | |
| 2003/0110467 A1 | 6/2003 | Balakrishnan | |
| 2003/0131338 A1 | 7/2003 | Georgalas | |
| 2003/0140058 A1 | 7/2003 | Martin et al. | |
| 2003/0200533 A1 | 10/2003 | Roberts et al. | |
| 2003/0217128 A1 | 11/2003 | Yanosy | |
| 2003/0229640 A1 | 12/2003 | Carlson et al. | |
| 2004/0006549 A1 | 1/2004 | Mullins et al. | |
| 2004/0015474 A1 | 1/2004 | Anonsen et al. | |
| 2004/0015487 A1 | 1/2004 | Lin et al. | |
| 2004/0015488 A1 | 1/2004 | Anonsen et al. | |
| 2004/0015489 A1 | 1/2004 | Anonsen et al. | |
| 2004/0015509 A1 | 1/2004 | Anonsen et al. | |
| 2004/0015814 A1 | 1/2004 | Trappen et al. | |
| 2004/0193579 A1 | 9/2004 | Dettinger et al. | |
| 2004/0205303 A1 | 10/2004 | Naveh et al. | |
| 2005/0027675 A1 | 2/2005 | Schmitt et al. | |
| 2005/0027720 A1 | 2/2005 | Schmitt | |
| 2005/0027732 A1 | 2/2005 | Kalima | |
| 2005/0050054 A1 | 3/2005 | Clark et al. | |
| 2005/0097108 A1 | 5/2005 | Wang et al. | |
| 2005/0097187 A1 | 5/2005 | Thompson et al. | |
| 2005/0138052 A1 | 6/2005 | Zhou et al. | |
| 2005/0149555 A1 | 7/2005 | Wang et al. | |
| 2005/0149907 A1 | 7/2005 | Seitz et al. | |
| 2005/0267901 A1 | 12/2005 | Irlen | |
| 2006/0184568 A1 | 8/2006 | Barcia | |
| 2006/0195460 A1 | 8/2006 | Nori et al. | |
| 2006/0195476 A1 | 8/2006 | Nori et al. | |
| 2006/0195477 A1 | 8/2006 | Deem et al. | |
| 2007/0266041 A1 | 11/2007 | Beckman et al. | |

FOREIGN PATENT DOCUMENTS

| | | |
|---|---|---|
| EP | 001457907 A | 9/2004 |
| WO | 9909494 | 2/1999 |
| WO | 02099702 A | 12/2002 |
| WO | WO 02/099702 A | 12/2002 |
| WO | 2004095312 A | 11/2004 |
| WO | WO 2004/095312 A1 | 11/2004 |
| WO | 2004107205 A | 12/2004 |
| WO | 2004107206 A | 12/2004 |
| WO | WO 2004/107205 A | 12/2004 |
| WO | WO 2004/107206 A | 12/2004 |

OTHER PUBLICATIONS

CN OA dated Aug. 15, 2008 for CN Application No. 200610004388.8, 9 pages.

European Search Report dated Mar. 21, 2007 for European Patent Application Serial No. EP 06 10 0768, 2 Pages.

U.S. Appl. No. 10/646,575, filed Aug. 21, 2003.

Bernes-Lee, T., Fielding, R., and Masinter, L. "Uniform Resource Identifiers (URI) : Generic Syntax" The Internet Society, Aug. 1998, 40 pages.

OA dated Dec. 10, 2008 for U.S. Appl. No. 11/468,008, 43 pages.

Chen, et al. "Turning Relational DBMS into Nested Relational DBMS" (2005) 12 pages.

CiteSeer. evidence for Chen reference, 2004.

"DB Interface Module User;s Guide" (2005) Rogue Wave, Section 7.4 https://www2.rougewave.com/support/docs/sourcepro/edition8/htm/dcoore/7-4.html 12 pages.

Blakely. "Data Access for the Masses through OLE DB" ACM 1996, pp. 161-172.

Mittal, et al., A Framework for eGovernace Solutions, Sep./Nov. 2004, vol. 48, 17 pages International Business Machines Corporation.

Davis, et al., Understanding Services for Integration Management, Department of Mathematical and Computer Sciences, The University of Tulsa, pp. 84-93, Springer-Verlag Berlin Heidelberg 2004.

Acharya, et al., Discovering and Using Web Services in M-Commerce, SCE Computer Networking, University of Missouri-Kansas City, 2004, pp. 136-151, Springer-Verlag Berlin Heidelberg 2005.

European Search Report dated Apr. 11, 2007 for European Patent Application Serial No. EP 06 10 1151, 2 Pages.

Australian Patent Office Search Report dated Apr. 27, 2007 for Australian Patent Application Serial No. SG 200508626-9, 3 Pages.

Distibuted Management Task Force DMTF: "CIM Database Model White Paper" CIM Version 2.8, Nov. 3, 2003, pp. 1-56, retrieved from http://web.archive.org/web/20040414223542/www.dmtf.org/standards/ published_documents/DSP0133.pdf, last accessed on Jun. 21, 2006.

Gwyn Cole, et al. "A Guided Tour of the Common Information Model Repository", Jan. 10, 2003, 16 pages, retrieved from http://www.informit.com/articles//printerfriendly.asp?p=30482&rl=1>, last accessed on Jun. 21, 2006.

European Search Report dated Jul. 6, 2006 for European Patent Application Serial No. EP 06 10 1024, 3 pages.

Chen. "The Entity-Relationship Model—Towards a Unified View of Data" ACM Transactions on Database Systems, vol. 1, Issue 1, Mar. 1976, pp. 9-36.

OA Dated Aug. 1, 2008 for U.S. Appl. No. 11/550,574, 30 pages.

European Search Report for European Patent Application No. EP 06 10 0768 dated Mar. 22, 2007, 10 pgs.

Ambler, S., "Mapping Objects to Relational Databases: O/R Mapping in Detail," (2002), downloaded from http://www.agiledata.org/essays/mappingObjects.html on Oct. 5, 2005 (31 pages).

Site Deck: Product Overview, Copyright 2002-2003 William. (2 pages).

Chinese OA dated May 15, 2009 for CN Application No. 200610004388.8, 8 pages.

Chinese OA dated Nov. 27, 2009 for CN Application No. 200610004388.8, 8 pages.

Svirskas, A., et al., "An Approach for Solving Java Object Persistence Issues using RDBMS and other Data Sources," Proceedings of the Fifth Eastern European Conference on Advances in Databases and Information Systems (ADBIS 2001), Sep. 25-28, 2001, Vilnius Lithuania (15 pages).

Ware, S., et al., "O/R Mapped Object Persistence is the Boon," Feb. 8, 2005, published on the Internet by internet.com, Foster City, CA, downloaded from <http://www.15seconds.com/issue/020805.htm> on Oct. 5, 2005 (13 pages).

PHOA for Phillipines Patent Application No. 1-2006-000129, 1 page.

PHOA for Phillipines Patent Application No. 1-2006-000129, 1 page.

Examination Report dated Feb. 7, 2006 for New Zealand Patent Application No. 544991, 2 pages.

Examination Report dated Dec. 20, 2006 for New Zealand Patent Application No. 544991, 2 pages.

EPOA dated Oct. 30, 2007 for European Patent Application No. 06101151.6, 5 pages.

EPOA dated Aug. 17, 2009 for European Patent Application No. 06101151.6, 4 pages.

CLOA due Oct. 6, 2009 for Chilean Patent Application No. 417-2006, 4 pages.

CLOA due Nov. 11, 2008 for Chilean Patent Application No. 417-2006, 3 pages.

CN OA dispatched May 15, 2009 for CN Application No. 200610004388.8, with English translation, 7 pages.

CN OA dispatched Nov. 27, 2009 for CN Application No. 200610004388.8, with English translation, 7 pages.

Israeli Office Action for IL Patent Application No. 173430 dated Mar. 10, 2010, 7 pages.

* cited by examiner

PLATFORM FOR DATA SERVICES ACROSS DISPARATE APPLICATION FRAMEWORKS

CROSS-REFERENCE TO RELATED APPLICATIONS

This application claims the benefit of U.S. Provisional Patent Application Ser. No. 60/657,556 entitled "PLATFORM FOR DATA SERVICES ACROSS DISPARATE APPLICATION FRAMEWORKS" and filed Feb. 28, 2005. This application also relates to the following U.S. Applications: Provisional Patent Application Ser. No. 60/657,295 entitled "DATA MODEL FOR OBJECT-RELATIONAL DATA" filed on Feb. 28, 2005, patent application Ser. No. 11/228,731 entitled "DATA MODEL FOR OBJECT-RELATIONAL DATA" filed on Sep. 16, 2005, Provisional Patent Application Ser. No. 60/657,522 entitled "STORAGE API FOR A COMMON DATA PLATFORM" filed on Feb. 28, 2005, and patent application Ser. No. 11/195,320 entitled "STORAGE API FOR A COMMON DATA PLATFORM" filed on Aug. 2, 2005 (now U.S. Pat. No. 7,685,561). The entireties of these applications are incorporated herein by reference.

BACKGROUND

Data has become an important asset in almost every application, whether it is a Line-of-Business (LOB) application utilized for browsing products and generating orders, or a Personal Information Management (PIM) application used for scheduling a meeting between people. Applications perform both data access/manipulation and data management operations on the application data. Typical application operations query a collection of data, fetch the result set, execute some application logic that changes the state of the data, and finally, persist the data to the storage medium.

Traditionally, client/server applications relegated the query and persistence actions to database management systems (DBMS), deployed in the data tier. If there is data-centric logic, it is coded as stored procedures in the database system. The database system operated on data in terms of tables and rows, and the application, in the application tier, operated on the data in terms of programming language objects (e.g., Classes and Structs). The mismatch in data manipulation services (and mechanisms) in the application and the data tiers was tolerable in the client/server systems. However, with the advent of the web technology (and Service Oriented Architectures) and with wider acceptance of application servers, applications are becoming multi-tier, and more importantly, data is now present in every tier.

In such tiered application architectures, data is manipulated in multiple tiers. In addition, with hardware advances in addressability and large memories, more data is becoming memory resident. Applications are also dealing with different types of data such as objects, files, and XML (eXtensible Markup Language) data, for example.

In hardware and software environments, the need for rich data access and manipulation services well-integrated with the programming environments is increasing. One conventional implementation introduced to address the aforementioned problems is a data platform. The data platform provides a collection of services (mechanisms) for applications to access, manipulate, and manage data that is well integrated with the application programming environment. However, such conventional architecture falls short in many respects. Some key requirements for such a data platform include complex object modeling, rich relationships, the separation of logical and physical data abstractions, query rich data model concepts, active notifications, better integration with middle-tier infrastructure.

SUMMARY

The following presents a simplified summary of the innovation in order to provide a basic understanding of some aspects of the architecture. This summary is not an extensive overview of the architecture. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises an architecture that facilitates data management between a common data store and multiple applications of multiple disparate application frameworks. It formalizes a mapping layer away from applications to map tables to objects. The architecture bridges the gap between desktop applications and Line-of-Business (LOB) application frameworks to allow applications to handle data at the level of application objects, rather than tables. Additionally, the architecture enables sharing of this data across all frameworks such that a data entity that is defined by an end-user application can be used by the LOB application, and vice versa.

The architecture includes a data storage component that facilitates the storage of data, which data includes structured, semi-structured, and unstructured data. A common data platform interfaces to the data storage component to provide data services accessible by a plurality of disparate application frameworks, which data services allow a corresponding application of the different frameworks to access the data. The data platform further comprises an API (Application Program Interface) that facilitates communicating to applications in the form of public classes, interfaces, and static helper functions, a runtime component that interfaces to the API and provides object-relational mapping, query mapping, and enforces constraints, and a constrain/security engine that facilitates declarative authoring of constraints, and controls access to entities of the data platform.

In another aspect of the subject innovation, a common data platform (CDP) provides data services which are common across a variety of end-user application frameworks (e.g., PIM (Personal Information Manager) framework to LOB (Line-of-Business) application frameworks. The range of applications include end-user applications such as Explorer, Mail, and Media applications; Knowledge Worker applications such as Document Management and Collaboration applications; LOB applications such as ERP (Enterprise Resource Planning) and CRM (Customer Relationship Management); Web Applications and System Management applications.

In yet another aspect thereof, the CDP provides benefits to applications that include a rich store which provides the capability to model and store structured, semi-structured, and unstructured data, flexible organization, rich query/search, rich behaviors, flexible administration, data synchronization, sharing, schemas, and flexible deployment in multi-tier environments.

To the accomplishment of the foregoing and related ends, certain illustrative aspects of the architecture are described herein in connection with the following description and the annexed drawings. These aspects are indicative, however, of but a few of the various ways in which the principles of the architecture can be employed and the subject innovation is intended to include all such aspects and their equivalents.

Other advantages and novel features of the architecture will become apparent from the following detailed description of the innovation when considered in conjunction with the drawings.

DETAILED DESCRIPTION

Figure 1:
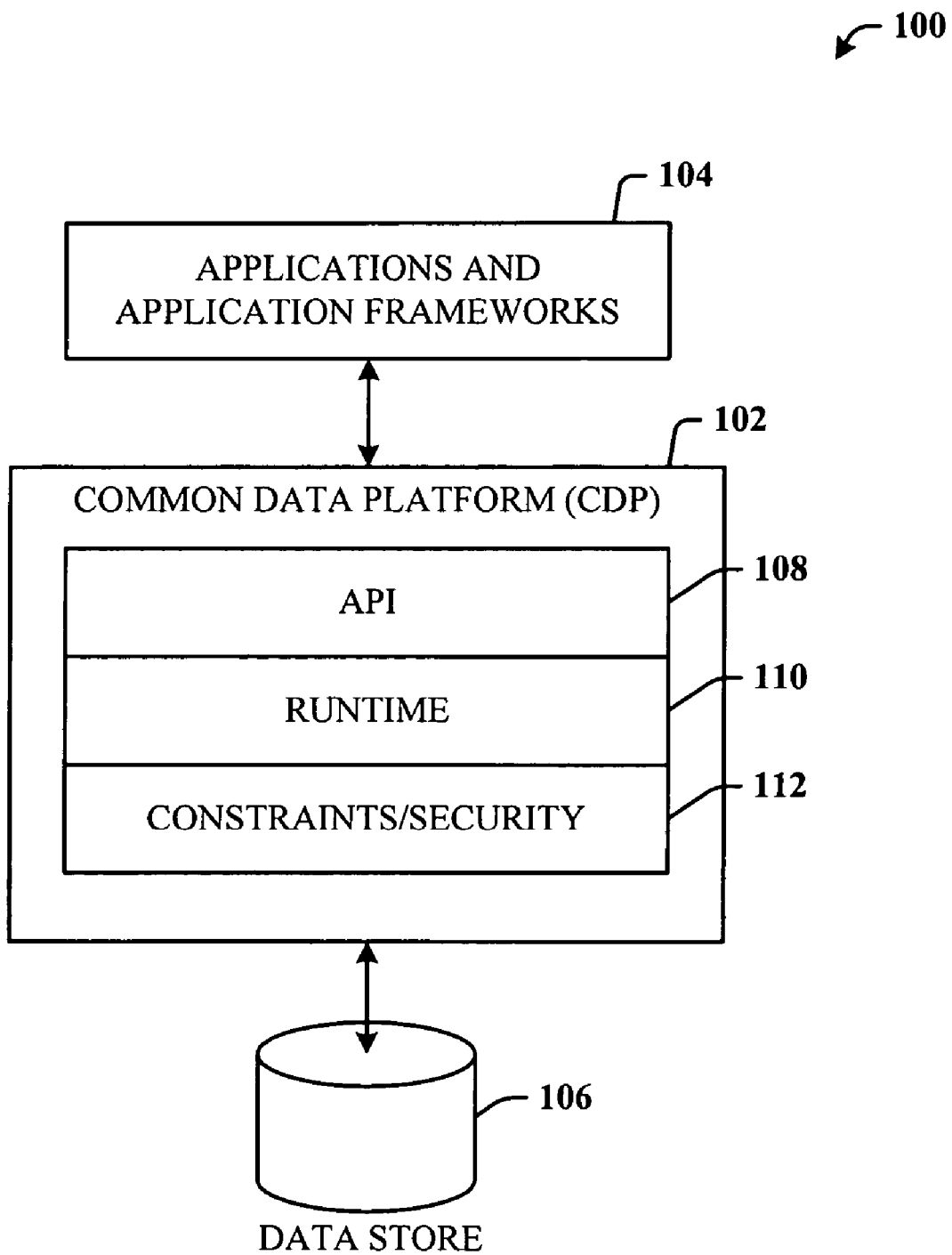
FIG. 1 illustrates a system that employs a common data platform (CDP) in accordance with the subject architecture.

The architecture is now described with reference to the drawings, wherein like reference numerals are used to refer to like elements throughout. In the following description, for purposes of explanation, numerous specific details are set forth in order to provide a thorough understanding of the subject innovation. It may be evident, however, that the architecture can be practiced without these specific details. In other instances, well-known structures and devices are shown in block diagram form in order to facilitate describing the architecture.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

A data platform is a platform that provides a collection of services (or mechanisms) for applications to access, manipulate, and manage data that is well integrated with the application programming environment. The subject innovation is an improvement over the conventional data platform. The architecture is a common data platform (CDP) that provides data services which are common across a variety of application frameworks (e.g., PIM (Personal Information Manager) framework, and LOB (Line-of-Business) framework). The range of applications include end-user applications such as Explorer, Mail, and Media applications; Knowledge Worker applications such as Document Management and Collaboration applications; LOB applications such as ERP (Enterprise Resource Planning) and CRM (Customer Relationship Management); Web Applications and System Management applications.

The CDP provides at least the following benefits to applications:

1. Rich store—the capability to model and store all types of data (structured, semi-structured, and unstructured).
    a. Relational data modeling and access.
    b. Rich object abstraction and programming environment.
    c. Semi-structured data modeling via XML storage and querying.
    d. Unstructured data as files.
2. Flexible organization—the capability to organize arbitrary collections of objects and not statically, as a table.
    a. Support for file system namespace and organization.
3. Rich query/Search—the capability to query all data.
    a. Support for rich querying (e.g., SQL, OSQL (object-oriented SQL), XML Querying, C# Sequences). OSQL is a functional language that is a superset of SQL.
4. Rich behaviors—support for rich data behaviors. This is not a replacement for application/business process logic.
5. Flexible administration—administration at different granularities (e.g., item level operations such as copy, move, and serialize).
6. Data Synchronization—peer-to-peer and master-slave synchronization of arbitrary collections of data.
7. Sharing—the capability to share data across multiple applications and multiple application frameworks. For example, sharing Contacts across Outlook and CRM applications.
8. Schemas—rich, out-of-the-box schemas for user and ISV (Independent Support Vendor) applications to facilitate collaboration with each other.

9. Flexible Deployment—deployable in two- and three-tier environments.

The CDP and associated architecture enables all the benefits described above. Key innovations include a layered architecture, a common data model that factors out the modeling concepts common across multiple application frameworks, and a CDP component (functional) architecture.

Referring initially to the drawings, FIG. 1 illustrates a system 100 that employs a CDP 102. The CDP 102 is employed to provide data management between data applications and application frameworks 104 and data on a data store 106. The data store 106 can store, for example, structured, semi-structured and unstructured data types. As indicated supra, the CDP 102 provides data services which are common across the application frameworks and end-user applications associated therewith. The CDP 102 further includes an API 108 that facilitates interfacing with the applications and application frameworks 104, a runtime component 110, and a constraint/security engine component 112. The API 108 provides the programming interface for applications using CDP in the form of public classes, interfaces, and static helper functions. Examples include StorageContext, StorageSearcher, Entity, TableSet, Table, EntityReference, and TableReference. It is to be appreciated that database programming language integration (e.g., C# sequence operators) can be part of the API 108.

The CDP runtime component 110 is a layer that implements the various features exposed in the public API layer 108. It implements the common data model by providing object-relational mapping and query mapping, enforcing data model constraints, etc. More specifically, the CDP runtime 110 includes: the common data model component implementation; a query processor component; a sessions and transactions component; an object cache, which can include a session cache and an explicit cache; a services component that includes change tracking, conflict detection, and eventing; a cursors and rules component; a business logic hosting component; and a persistence and query engine, which provides the core persistence and query services. Internal to persistence and query services are the object-relational mappings, including query/update mappings. The CDP 102 also includes the constraint/security engine 112 which provides for applying constraints against the data store 106 and security policies, for example, role-based security.

Figure 2:
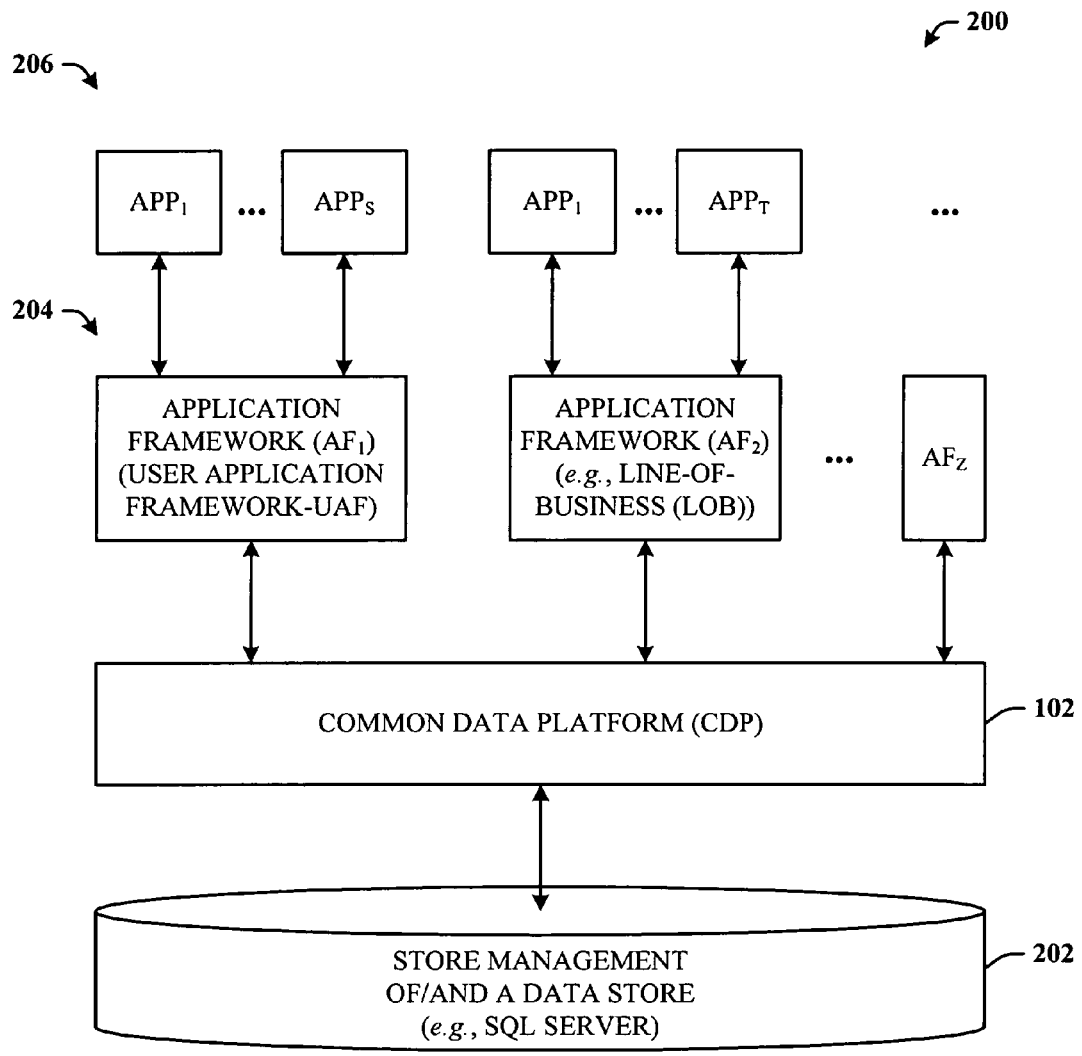
FIG. 2 illustrates a more detailed CDP system in accordance with the disclosed architecture.

FIG. 2 illustrates a more detailed CDP system 200 that can include the CDP 102, which interfaces to a store management component 202 of a separate data store (not shown). Alternatively, the store management component 202 can include the data store, such as which can be associated with a SQL server implementation. It is to be appreciated that the data store can store structured, semi-structured and unstructured data types.

A goal of the CDP is to support rapid application development, by enabling support for a variety of application frameworks 204 (denoted $AF_1, AF_2, \ldots, AF_Z$). The frameworks 204 can include LOB, end-user, and system management application frameworks, for example. Applications 206 (denoted $APP_1, \ldots, APP_S; APP_1, \ldots, APP_T$) associated with the application frameworks 204 ($AF_1, AF_2, and \ldots AF_Z$, respectively) can leverage the respective application frameworks 204, the CDP 102, and the underlying stores 202 to develop rich applications. The benefits of a layered approach are described infra.

The store management layer 202 provides support for core data management capabilities (e.g., scalability, capacity, availability and security); the CDP layer 102 supports a rich data model, mapping, querying, and data access mechanisms for the application frameworks 204. The CDP mechanisms are extensible so that multiple application frameworks 204 can be built on the data platform. The application frameworks 204 are additional models and mechanisms specific to application domains (e.g., end-user applications and LOB applications). The layered architectural approach has several advantages. It allows for each layer to innovate and deploy independently and rapidly. The CDP layer 102 can be more nimble, have more freedom for innovation, and can innovate more frequently than the store layer 202. The layered approach aligns the CDP layer 102 with the company strategy. Finally, the store layer 202 can focus on the core data management capabilities, consistent with the strategy.

Figure 3:
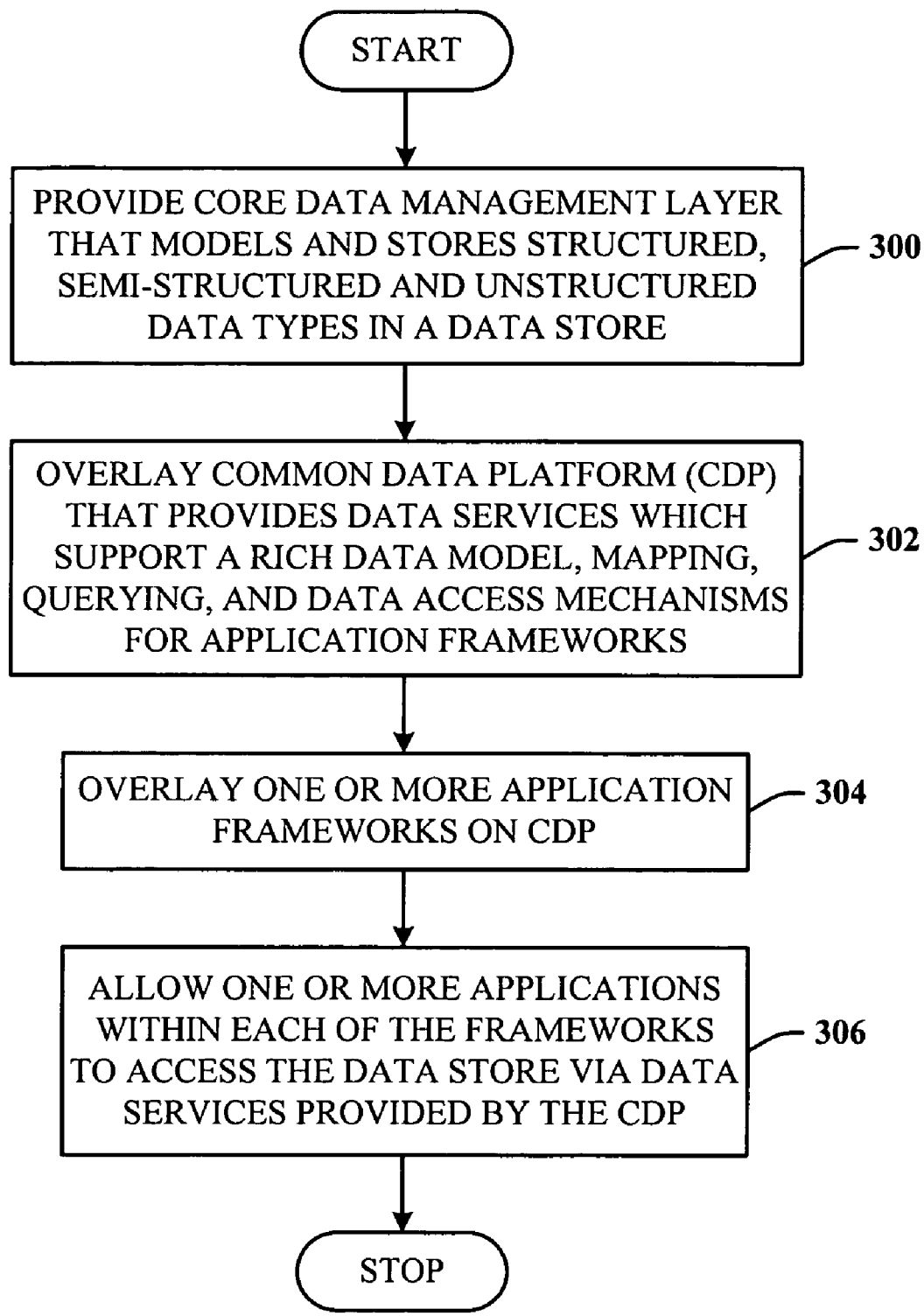
FIG. 3 illustrates a methodology of implementing a common data platform that facilitates managing data.

Referring now to FIG. 3, there is illustrated a methodology of implementing a common data platform. While, for purposes of simplicity of explanation, the one or more methodologies shown herein, e.g., in the form of a flow chart, are shown and described as a series of acts, it is to be understood and appreciated that the subject architecture is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the architecture.

At 300, a core data management layer is provided that models and stores structured, semi-structured and unstructured data types in a data store. At 302, a CDP 110 layer is applied over the core data management layer to provide data services which support a rich data model, mapping, querying, and data access mechanisms for application frameworks. At 304, one or more application frameworks overlay the CDP. At 306, one or more applications are provided within each of the application frameworks that can now access data of the data store via the data services provided by the CDP.

Figure 4:
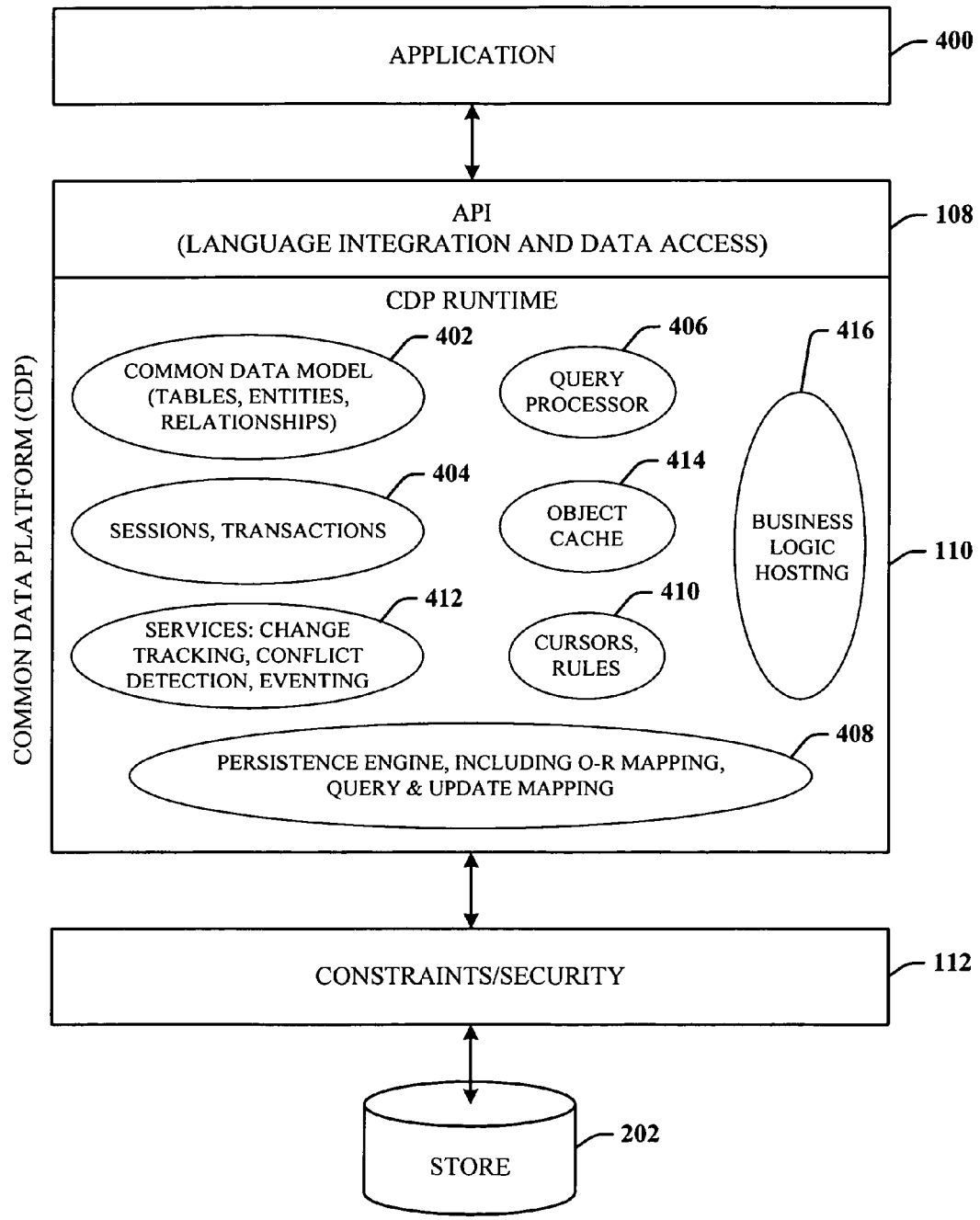
FIG. 4 illustrates a schematic diagram of CDP components in relation to the architecture of the subject innovation.

FIG. 4 illustrates a schematic diagram of CDP components of the subject architecture. It is to be appreciated that the positioning of any components and/or boxes in this schematic does not imply (or necessarily prevent) any specific deployment across process/machine boundaries. The CDP utilizes an optimistic concurrency model so that if changes are to be saved, and other changes have already been made to the underlying data, conflict detection resolves this in an application-specific manner. To be an effective data platform, the CDP includes features such as programming language integration, rich data modeling, persistence framework, services, and so on. The API 108 facilitates language integration and data access by an application 400 via the CDP runtime 110 to the store 202. Being domain agnostic implies that the CDP makes the barest minimum of assumptions about the nature and shape of data and the semantic constraints required on it. To this end, the CDP provides the following features (described in more detail infra):

Common Data Model (CDM): At the center of CDP runtime 110 is a CDM 402. The intent of the CDM 402 is to factor out the modeling concepts common across multiple application domains, from applications working mainly with user data (PIM, documents, etc.) to LOB and enterprise data. In addition to providing rich object and relationship abstraction, the CDM 402 provides support for structure, unstructured and semi-structured data.

Row/entity data—The CDM 402 supports a rich Entity-Relationship model to capture the structure and the behavior of structured data (e.g., business data). The CDM 402 is a superset of the core relational model, with extensions for rich object abstraction and relationship modeling (e.g., an Author relationship between Documents and Contacts; a Lines relationship between Purchase Orders and Order Lines).

File data—The CDM 402 supports the "file stream" data type to store and manipulate unstructured (file) data. The file stream data type can store the data as a file and supports file access APIs. The file stream data type is natively supported in SQL Server, mapped to an NTFS file stream, and supports all the file handle/stream based operations. In addition to modeling the unstructured content as a file stream in the CDM 402, using the entity types, useful content can be promoted as structured properties. Database-based file storage systems define the notion of a file backed item, which is an entity that models the structured properties along with the file stream of unstructured content. The file backed items provide for rich querying along with stream based operations on the associated file stream.

XML data—XML documents can be modeled to two primary ways in the CDM 402: (1) store it as an XML data type; (2) map the XML document to one or more entities (e.g., similar to data contracts). CDM 402 supports the XML data type as supported in SQL Server. The XML data type can be type of any entity property; the XML data type allows for untyped or typed XML documents to be stored. Strong typing is provided by associating one or more XML schemas with the XML document properties.

Programming Language Integration, including Query, in the API 108: The core CDP feature components-sessions and transactions 404, query 406, persistence 408, cursors 410, services 412, object cache 414 and business logic hosting 416 are encapsulated in several "runtime" classes available in the CDP API 108 (e.g., StorageContext). Based on the types authored in the CDM 402, the CDP design time tools generate strongly typed CLR (Common Language Runtime) classes. CDP requires a query language over the type system defined by the CDM 402. CDP may support C# Sequence Operators and OPATH as its query language. For the purpose of the subject application, the query languages supported by CDP are generally referred to as Common Query Language (CQL). CQL is envisioned to subsume the core relational algebra (e.g., select, join, and project operators). While the syntax may not be identical to SQL, CQL can be mapped to SQL in a straightforward way. CQL allows rich queries against the object structures that the programmer works with. The goal is to align CQL with the Sequence Operators work being done by the C# group. These features effectively provide a strongly typed, object based abstraction against data stored in a relational database management system (RDBMS) (or any other CDP enabled store). Furthermore, CDP's persistence framework can be used to durably persist and query for Plain Old CLR Objects (POCO).

Persistence Engine—A persistence engine provides declarative mapping definitions that describe exactly how objects are assembled out of the component pieces that come from the relational stores. The engine includes a query generation component (not shown) that takes an expression defined by the query processor, in terms of an object query expression, and then combines it with the declarative mapping. This turns into equivalent query expressions that access the underlying tables in the database. An update generation component (not shown) looks at change tracking services, and with the help of mapping metadata, describes how to translate those changes in the world of objects to changes in the world of tables.

Querying/searching File and XML data—As explained above, the CDM 402 stores the unstructured and semi-structured data using the file stream and XML data types, respectively. The CQL is capable of querying these data types. For file content promoted to structured entities (e.g., WinFS file backed items), CQL's relational operators can query these entities. The unstructured data stored as file stream can be queried using full-text search. The XML content can be queried using XPath or XQuery.

Object-Relational Mappings: Since CDP provides an object-based abstraction on top of a relational (tabular) storage, it needs to provide an O-R mapping component. CDP supports both prescriptive mappings (CDP decides how mapping occurs) and non-prescriptive mappings (type designer has some flexibility in specifying mappings). Notice that a database based file storage system implementation today uses prescriptive mappings while more general O-R persistence frameworks need non-prescriptive mappings.

Caching: CDP runtime maintains a cache of query results (e.g., cursors) and uncommitted updates. This is called the session cache. CDP also provides an explicit cache, which enables the application to work in a disconnected mode. CDP provides various consistency guarantees for data in the explicit cache. The cache performs identity management by correlating on-disk identity of data with the in-memory objects.

Query Processor: When querying against the store, CQL queries are mapped to SQL; however, when going against the explicit cache, CQL queries are processed by the QP component. Database access is via the query processor. The query processor allows multiple frontends to handle multiple query languages to be expressed, and then mapped to an internal canonical format. This is done in terms of the domain model and objects of the application it is working on. The queries then get passed to the processor, which is a pipeline, and then get converted into backend-specific queries.

Cursors: CDP provides both forward-only and scrollable cursors. Cursors support notifications, multi-level grouping with expand/collapse state, dynamic sorting and filtering.

Business Logic Host: CDP provides a runtime environment to host data-centric logic on types/instances and on operations. Such data-centric business logic is distinct from application/business process logic, which can be hosted in the application server. Objects are not just rows in a database. When objects get materialized in memory, they are actually objects that have behaviors which the application can invoke. There are extension points in the system that are mainly events and callbacks that all operate to extend the CDP at runtime. These objects are not just objects, but CLR objects, NET objects, etc. CDP allows the capability to intercept property ort method calls in those objects. Applications can customize the behavior of these objects.

Services: CDP provides a core set of services which are available to all CDP clients. These services include rules, change tracking, conflict detection, eventing, and notifications. Eventing extends the CDP runtime 110 from framework-level services or for applications to add additional behaviors, and also is used for data binding at the user interface.

Constraints: The CDP provides the constraints/security component 112 to at least one of allow the type designer to author constraints declaratively. These constraints are executed in the store. Typically, the scope of CDP constraints encompasses notions such as length, precision, scale, default, check, and so on. These constraints are enforced by the CDP constraint engine at run time.

Security: CDP provides a role based security model—the user's credentials determine her "role" (such as administrator, power user, approver, etc.). Each role is assigned a set of access permissions. CDP's security engine enforces these security policies. In addition, the CDP provides a security model for controlling access to entities in the CDP. The security model can support authentication of an operating system user, authorization level of entities (e.g., with separate permissions for read and update), etc.

Note that the constraints/security component 112 is illustrated separate form the CDP runtime component 110, since it can operate as a separate entity therefrom. Alternatively, and perhaps more efficiently, the constraints/security component 112 is combined with the store component 202, which can be the database system.

Taken together, these features provide a powerful platform for developing data centric applications and logic which can be flexibly deployed across different tiers. Note that the positioning of the runtime components (or boxes) in this diagram does not imply (or necessarily prevent) any specific deployment across process/machine boundaries. It is a schematic diagram used to show functional components.

One of the key advantages of the CDP architecture is that it provides flexibility in implementation. This means two things:

1) Some of the components shown in FIG. 4 are "mobile" in the sense that they can live in different processes/Tiers. Specifically, the Constraints/Security engine 112 typically lives in the store process 202 of FIG. 2.
2) Not all components shown in FIG. 4 need to be implemented in order to have a fully functioning data platform. Specifically, the Object Cache 414 can consist of just a session cache. In another implementation, the cache 414 can include an explicit cache which will be synchronized with the store. The query processor 406 operates over objects in the object cache 414.

Several features and/or components of the CDP are described in more detail hereafter. As stated supra, at the center of the CDP is a common data model (CDM) 402, wherein the intent of the CDM 402 is to factor out the modeling concepts common across multiple application domains, from applications working mainly with user data (e.g., PIM, documents, etc.) to LOB and enterprise data. In general, there are two possible techniques that can be utilized to implement such functionality: 1) Model concepts specific to every conceivable (or conceivably important) domain. For instance, define precisely what a "Customer" means (from LOB domain) and what a "Person" means (from user domain) and so on; and 2) Provide a flexible base over which application designers may create their own, domain specific types, constraints, relationships. The CDM 402 utilizes the second approach such that it provides a basic set of types and defines a flexible framework for authoring new types. In this sense, the CDM 402 can be both a data model (e.g., it actually defines certain types and their semantics) and also a data meta-model (e.g., it allows specification of other models).

Some of the features of the CDM 402 are discussed below but are not to be seen as limiting on the subject application. The data model can subsume the relational data model. In other words, the concepts of tables, rows, queries, and updates on tables are exposed by the CDM 402. The CDM 402 can define a richer object abstraction for data than tables and rows. In particular, it enables the modeling of real world artifacts using concepts such as entities, relationships among entities, inheritance, containment, and collections of such. In addition, the CDM 402 can minimize the impedance mismatch between application structures and storage structures by aligning the programming language type system closely with application abstractions modeled therein. Moreover, support for application behaviors (e.g., methods, functions) and a flexible deployment of behaviors to enable two-tier and multi-tier applications can be provided. The CDM 402 can also capture persistence semantics independently of the underlying physical store, allowing the enablement of the CDM 402 to be implemented over a wide variety of stores.

The CDM 402 can invoke a plurality of concepts. The following concepts can be utilized by the meta-model to be implemented to design domain specific data models. In particular the following concepts can be considered the core of the CDM 402: 1) an entity type can be an application designer's specification for a grouping of properties and methods, wherein an entity is an instance of an entity type. It is to be appreciated that an entity type can be organized through inheritance hierarchies; 2) a table is a collection of entities which can be properties of other entities. Using entities, inheritance, and tables, applications can recursively define data hierarchies. The table can be strongly typed in the sense that a given table can only contain entities of a given type or its subtypes; 3) a table set can be an entity whose properties are tables. This is the base case for the recursive data hierarchy defined using tables and entities. It can be substantially similar to the concept of a database; and 4) A relationship can express semantic connections between entities. It is to be appreciated that the relationship can be extended to define associates, containment, etc.

An entity, relationship, and/or table set definition can occur in the context of, for example, a schema. For the purpose of this subject application, the primary purpose of the schema is to define a namespace for scoping the names of the elements defined in the schema. A table set can form the "top level" of the CDM 402. The storage can be allocated directly and/or indirectly by creating a table set. For instance, the following pseudo code illustrates an example of a table set:

```
<Schema Namespace="MySchemas.MyLOB">
<TableSetType Name="LOBData">
<Property Name="Orders" Type="Table(Order)"/>
<Property Name="Customers" Type="Table(Customer)"/>
<Property Name="Products" Type="Table(Product)"/>
<Property Name="Suppliers" Type="Table(Supplier)"/>
<Property Name="PSLinks" Type="Table(ProductSupplierLink)"/>
</TableSetType>
<TableSet Name="LOB" Type="TableSetType"/>
</Schema>
```

An Entity type can have properties and methods associated therewith. For specifying the types for properties, method parameters and method return values, the CDM 402 provides several built-in types: 1) Simple types: Int32, string, other CLR value types; 2) Enumeration types: equivalent to CLR enums; 3) Reference types (discussed infra); and 4) Array types: ordered collection of inline types (discussed below). Properties of these built in types can be grouped together to form an Inline Type, wherein the inline type can have members of other inline types. Below is an example of the above:

```
<InlineType Name="Address">
<Property Name="Line1" Type="String" Nullable="false">
<Length Maxiumum="100"/>
</Property>
<Property Name="Line2" Type="String" Nullable="true">
<Length Maxiumum="100"/>
</Property>
<Property Name="City" Type="String" Nullable="false">
<Length Maxiumum="50"/>
</Property>
<Property Name="State" Type="String" Nullable="false">
```

-continued

```
    <Length Minimum="2" Maximum="2"/>
  </Property>
  <Property Name="ZipCode" Type="String" Nullable="false">
    <Length Minimum="5" Maximum="5"/>
  </Property>
</InlineType>
```

The entity can be constructed by utilizing the built-in types and/or inline types. For example, the following pseudo code demonstrates the entity:

```
<EntityType Name="Customer" Key="CustomerId">
<Property Name="CustomerId" Type="String" Nullable="false">
<Length Minimum="10" Maximum="10"/>
</Property>
<Property Name="Name" Type="String" Nullable="false">
<Length Maximum="200"/>
</Property>
<Property Name="Addresses" Type="Array(Address)">
<Occurs Minumum="1" Maximum="3"/>
</Property>
<NavigationProperty Name="Orders" Association="OrderCustomer"
FromRole="Customer" ToRole="Orders"/>
</EntityType>
```

The entity (except the table set) can be contained within a table based at least in part because table sets are the top level organizational unit and a table set is composed of tables. Within a table scope, each entity can have a unique key value. At store-wide scope, each entity can have a unique identity—its key value concatenated with its table's identity, recursively. The entity can be the smallest unit in the CDM 402 referenceable by key and/or identity. The storage operations can target the entity, wherein the operations can be, but are not limited to persist, store, move, copy, delete, rename, backup, restore, etc. The inline type instance can be used in the context of the containing entity. CDM 402 can define the concept of an abstract entity type, which are substantially similar to abstract classes in the CLR. In other words, they cannot be instantiated directly; they can only be derived from to create other instantiable types.

An entity reference can be defined as a durable, persistent reference to entities. Reference values range over entity identities. Indirecting an entity yields its reference; dereferencing a reference yields the entity instance. The primary purpose of references is to enable entity sharing: for example, all orders for the same customer would have the substantially similar value for the Ref(Customer) property, so the order entities are said to share the customer entity (e.g., the sixth line of code in the following code sample is an example).

The data associated with the CDM 402 has relationships among its constituent parts. The relational model does not explicitly support relationships; PK/FK/Referential Integrity provide tools to implement relationships in a limited way. Yet, the CDM 402 supports explicit conceptual modeling of relationships using associations and compositions. The following example can be illustrated to understand the capabilities of associations and compositions:

```
1. <EntityType Name="Order" Key="OrderId">
2.   <Property Name="OrderId" Type="String" Nullable="false">
3.     <Length Minimum="10" Maximum="10"/>
4.   </Property>
5.   <Property Name="Date" Type="DateTime" Nullable="false"/>
6.   <Property Name="Customer" Type="Ref(Customer)"
7.     Association="OrderCustomer"/>
8.   <Property Name="Lines" Type="Table(OrderLine)"
9.     Composition="OrderOrderLine"/>
10.    <Property Name="ShippingAddress" Type="Address"
           Nullable="false"/>
11. </EntityType>
12. <Association Name="OrderCustomer">
13.    <End Role="OrderRole" Type="Order" Multiplicity="*"
14.      Table="SalesData.Customers"/>
15.    <End Role="CustomerRole"
         Type="Customer" Multiplicity="1" />
16.    <Reference FromRole="OrderRole"
         ToRole="CustomerRole"
         Property="Customer" />
17. </Association>
18. <Composition Name="OrderOrderLine">
19.    <ParentEnd Role="Order" Type="Order" Property="Lines"/>
20.    <ChildEnd Role="OrderLine" Type="OrderLine"
         Multiplicity="100"/>
21. </Composition>
```

The associations can represent peer to peer relationships between entities. In the above example, an order is related to a customer via an association. In the code sample above, line 6 shows that the order has an associated customer (which is specified by the reference property Customer). The nature of the association is defined in lines 12-15: it says that the OrderCustomer association is from Order to Customer (line 15); it also says that for each Customer (Multiplicity="1" on line 14), there can be multiple Orders (Multiplicity="*" on line 13). The type of association depicted above can be called a reference association.

CDM 402 defines two other types of associations: Value Associations and Association by Association Entities. Value associations allow expression of relationships via any property, not just via identity reference (e.g., Document.Author property relates to Contact.Name via the equality condition). Association entities allow the modeling of relationships where the relationship itself carries some data (e.g., the employment relationship between a company and a person might carry properties like the employment period or the rank and title of the person within the company).

Compositions can represent parent-child relationships and/or containment relationships. Consider Orders and OrderLines (e.g., Order is the sum total of what you put in the shopping cart at a website; OrderLine is each individual item in the cart—a book, a DVD, etc.). Each OrderLine makes sense only within the context of an Order. The OrderLine may not independently exist outside of the containing Order. In other words, an OrderLine is contained within an Order, and its lifetime is determined by the lifetime of the Order.

The above depicted relationships can be modeled using Compositions. Line 8 shows an example of a composition. Lines property and the OrderOrderLines composition (lines 18-22) express that an order controls its lines and that lines depend on the order that houses them. It is to be appreciated that the order is the parent and lines are the children. The main difference between compositions and inline types is that compositions involve entities. In other words, it will be possible for an OrderLine to be the target of a reference, whereas an inline type cannot be in the above example.

One benefit of the CDM 402 and its explicit modeling of relationships is that it supplies metadata support for query. An upstream query can be utilized as well. For instance, given a customer, find all the orders (without having to store explicit backpointers) can be invoked by implementing a Navigation-Property within the CDM 402. This is shown in line 28 of the code fragment seen above and reproduced below for convenience.

```
28. <EntityType Name="Customer" Key="CustomerId">
29.   <NavigationProperty Name="Orders"
      Association="OrderCustomer"
      FromRole="Customer" ToRole="Orders"/>
30. </EntityType>
```

The persistence engine 408 can include object-relational mappings. In other words, the modeling, access, and query abstractions provided by the CDP is object based. The primary storage technology utilized by the CDP is relational based (e.g., SQL 2000). The persistence engine 408 utilizes object-relational mappings (also referred to as "O-R mappings"), wherein the persistence engine 408 can map the language classes to the underlying tabular representation.

The persistence engine 408 can provide two cases when considering O-R mappings: 1) prescriptive O-R mappings; and 2) non-prescriptive O-R mappings. Prescriptive O-R mappings are the mapping between CDP types, wherein their relational representation can be hard coded into CDP. The type designer has little and/or no flexibility in choosing the layout of the underlying tables. An example of this can be a database-based file storage system. Non-prescriptive O-R mappings are where the developer has varying degrees of flexibility to choose how the CLR classes map to the underlying storage structures. There are two sub-cases that can be considered. 1) Exposure of an existing relational schema as objects. The type designer uses a high-level specification language to design CDM types, tools to generate classes based on them, and the flexibility to specify how the types map to tables. This scenario arises when CDP applications are deployed side-by-side (in the sense of using the substantially similar data) with existing relational applications. For example, a car company's IT department can have an LOB application, wherein it wants to write a CDP application which goes against the same data (probably as part of a step-by-step migration strategy). But the requirement is that both the LOB application and the new CDP application run together against the same data. 2) Persistence of a collection of classes into a relational schema. The developer does not use generated classes; rather, they utilize classes of own design. The developer wants to map these classes to a relational schema. It is to be appreciated that there are many different scenarios which generate this requirement The CDP can further include a programming surface (not shown) that can be utilized during design time. The programming surface can be made available to a CDP application designer(s) and/or programmer(s). The programming surface can be classified into three general areas: 1) design-time programming tools (e.g., tools to enable type designers to author CDM types and constraints thereof, generate CLR classes from these types, and add behavior to the types); 2) API (e.g., classes and methods for writing CDP applications); and 3) query (e.g., language for querying CDM objects such as entity instances. These components of the programming surface work synergistically to provide a strongly typed, object based abstraction against the underlying store data.

The CDP provides a declarative Common Schema Definition Language (CSDL), analogous to SQL's data definition language or C# class definitions, for defining entity types, entity tables, relationships among entity types, and constraints. There three main design-time components.

1. API Generator. The application designer designs CDM types and relationships using CSDL and uses a design-time CDP tool called APIG (pronounced ay-pig), which generates partial CLR classes corresponding to these types and relationships. The APIG-generated classes are available as assemblies to application programmers and can be referenced by their application programs with the C# using clause. The classes generated by APIG are, in a sense, canonical classes; they can be a direct representation of the CDM types within an application program. In one example, application classes can be constrained in their definition—such as, for instance, when the application is using classes from a pre-written class library (graphics package, math package, etc.). The application can use the object persistence framework of CDP to durably persist and query for instances of these classes in the store. Such objects can be referred to as Plain Old CLR Objects, or POCO. CDP supports POCO scenarios as well.

2. Object-relational mapping. This component of the CSDL helps application designers declare concrete, non-prescriptive mappings between store concepts such as tables and views, and CLR classes. It can also specify how a constraint defined in terms of the CDM 402 could be mapped to a SQL declarative constraint, a trigger or stored procedure.

3. Behaviors. The CSDL enables application designers determine what portion of the business logic is implemented as instance methods, as static functions, as stored procedures. It also determines the tier where the logic may run (e.g., CDP runtime vs. store).

The programming surface can further include a CDP API, wherein programming surface applications can be written against. The CDP API can have three subparts:

1. Generic CDP data access. This is the portion of the API that exposes stores, sessions, transactions (e.g., Storage-Context), query services (e.g., StorageSearcher), and CRUD services (e.g., SaveChanges).

2. CDM data classes. This is the set of canonical, application-independent classes exposing CDM concepts such as Entity, Relationship, Extension, etc.

3. Domain data classes. These are application/framework-specific classes such as Contact, Message, PurchaseOrderes that conform to the CDM 402 but expose domain-specific properties and behaviors.

CDM 402 can also define a query language, the CQL. CQL is designed to allow rich queries against the object structures that the programmer works with. The following are three identified techniques utilized for the basis of the CQL formalism:

1. OPath: The OPath language has its roots in SQL and XPath and was designed to be a CLR-object version of XPath. The design builds on the XPath concept of path expressions to expose a method of dereferencing properties of objects in sequence. The design is based on one simple principle: developers expect to see collections of objects as the primary "structural" construct in an object oriented API. OPath can be the POR query formalism for a database-based file storage system.

2. Object SQL: This approach extends the SQL query language to manipulate graphs and collections of CDM objects. Windows Query Language (WinQL), a variation of SQL designed to query and manipulate graphs of CLR objects, is a candidate design for the extensions needed in SQL.

3. C# Sequence Operators: This is a set of C# extensions for strongly typed, compile-time checked query and set operations that can be applied to a broad class of transient or persistent collections of CLR objects (e.g., via Object-Relational mappings Strategically, the C# Sequence Operators approach makes the most sense for becoming the framework for CQL. CQL is a query language. Creates, updates, deletes are performed as object operations (new, property setters, etc.). The O-R mapping component within the persistence engine 408 can map these operations to underlying DML operations in SQL.

A relationship between CDM types and the programming surface is described below. The concept of a "type" in CDM 402 can be viewed at three different levels:

1. Schema Space: The description of the type in a CDM schema. These are abstract types in the sense that they may not explicitly be materialized within any component of the runtime stack (e.g., from the application all the way down to the store).
2. Application Space: The representation of the types as CLR classes within the CDP API. There can be a 1-1 correspondence between entity/inline types in the schema space and the data classes in the application space. In other words, each entity and inline type in the CDM schema can result in a CLR class. Often, these classes are automatically generated by APIG; however, in the POCO case, the developer can explicitly specify a mapping between CLR classes and types in the schema space. The application space can also contain relationship classes in addition to classes for entity and inline types.
3. Storage Space: The persistence format of the type in the underlying store. If the store is a relational store, then these types are tables/UDT/core SQL types. The O-R mapping component of CDP supports a mapping schema that allows types in the schema space to be mapped to the types in the storage space (e.g., the Purchase Order entity type could be mapped to the PurchaseOrder table in SQL Server).

The CDP query language targets the application space. This makes sense because a developer wants to query using the substantially similar abstractions that they use for other operations (e.g., objects and collections). However, the semantics of CQL are described using CDM abstractions (the schema space).

The CDP can also include constraints/security 112. Almost all data, when examined within their larger semantic context, will be constrained over the domain of its type in some form or another. It is thus very important for the CDP to provide a way for type and application designers to express these constraints. The CSDL can be used to author constraints declaratively at the time of type design. Examples of constraints include, but are not limited to: 1) simple type constraints such as length, precision, scale, default and check; 2) array type constraints such as element constraints, occurs, unique, and check; and 3) property constraints, etc.

These constraints can be enforced by the CDP constraint engine at run time. Note that the very act of conforming to the CDM 402 implies a set of constraints when seen from the level of the underlying relational store. For example, CDM 402 requires that "every entity has a unique key within the scope of its containing table." This translates to a unique key constraint at the store level. There are several other examples of such constraints. The point here is that the CDP constraint engine enforces two types of constraints: those that are implied by (and required for the conforming to) the CDM 402 and those that are authored by the type designer. In addition to declarative constraints authored in CSDL, constraints can also be written using SQL Server stored procedures. This method allows the expression of more complicated constraints than are possible the declarative language.

Moreover, the constraints/security 112 can provide a security model for controlling access to entities in the CDP. The security model for the CDP must satisfy at least the following scenarios:

Authentication: The security model can support authenticating operating system users. This includes users in a domain, workgroup or a disconnected client machine. It can also include support for both NTLM and Kerberos based authentication.

Authorization: The CDP security model can support authorization of security at least at the entity level. It must also allow managing separate permissions for read and update of the entity. At the minimum, the constraint/security 112 provides for a "property" and/or a set of properties of an entity to be deemed as the security identifier of an entity. The access rights of an entity are determined by a function associated with the table which takes the security identifier as a parameter. The CDP should also allow separately provisioning the users who can change the security identifier from the users who can change the rest of the entity. It is to be appreciated that the CDP can support a more general role based model which also allows different permissions that just read and write.

The CDP runtime 110 maintains a cache 414 (e.g., an object cache 414) of query results (e.g., cursors discussed in detail infra) and uncommitted updates, wherein such cache can be referred to as the session cache because it is tied to the sessions, transactions 404. In addition, it comes into existence when a session is created and goes away when the session is terminated. The CDP session is encapsulated within the StorageContext object. An application can instantiate multiple instances of StorageContext, thereby initiating multiple sessions and hence multiple session caches. The CDP can also expose another kind of cache, called the explicit cache. The explicit cache provides a cache of data from one or more queries. Once data is materialized into the explicit cache, the following data consistency guarantees can be provided: 1) read-only, not-authoritative; 2) write-through, authoritative; and 3) automatic refresh via exogenous notifications. The programming and query model against the explicit cache can be substantially similar as that over store data The cursor, rules 410 are mechanisms that allow the set of data entities returned from CQL to be processed one at a time. An application can create a cursor over the result set by simply copying the entire result set into memory and overlaying a scrolling pattern on top of this in memory structure. But the ubiquity of this requirement and the complexity that is some times involved in implementing a cursor (especially when updates, paging, etc. are taken into account) means that any data platform should provide a cursoring model.

CDP provides both forward-only and scrollable cursors. In addition to the basic functionality of browsing and scrolling, CDP cursors provide the following features: 1) exogenous notifications and maintenance; 2) multi-level grouping with expand/collapse state; and 3) dynamic sorting and filtering (e.g., "post-processing"). It is to be appreciated and understood that cursors may not be a different mechanism to specify a result set; result sets are specified by queries, and cursors are over these queries.

The CDP can also include the business logic hosting 416. When multiple applications are manipulating substantially similar data, a key requirement is to ensure that the data remains trustworthy—that is, guaranteeing that data conforms to the various validation rules, business rules, and any other system of checks and balances instituted by the type designer and/or data owner. It is a good assumption that applications in general are not trustworthy. Out of stupidity, malice, and/or the simple exigencies of unforeseen usage patterns, applications save and/or attempt to save invalid. For example, a user can enter 292 as the area code and the application saves such number even though 292 is an invalid area code and hence the value in the telephone number field no longer represents a telephone number. In other words, it cannot be "trusted" to be a telephone number. The usual way to prevent this is to create a trust boundary: some body of declarative rules/validation code/etc. (e.g., commonly referred to as business logic) which runs in a separate process and inspects data changes made by the application to "approve" such change. Then, it can save these changes to the store. Many times, business logic does more than inspect-and-approve; it also enforces business rules, causes workflow to happen, etc. (e.g., when a new customer is inserted, email should be sent to the credit-check department to ensure credit-worthiness).

CDP provides several mechanisms for authoring business logic (BL). These mechanisms can be divided into the following 5 categories: constraints, event handlers, static/instance methods, bindable behaviors, and static service methods each of which is discussed in more detail below. The constraints/security 112, as discussed supra, can be declarative and procedural. These constraints can be executed on the store, close in proximity to the data. Thus, the constraints 112 are considered to be within the trust boundary. Moreover, constraints can be authored by the type designer.

The business logic hosting 416 can employ an event handler. The CDP API raises several events on data change operations. BL authors can hook into these events via handler code. For example, consider an order management application. When a new order comes in, the application needs to ensure that the value of the order is less than the credit limit authorized for the customer. This logic can be part of event handler code which is run before the order is inserted into the store.

Broadly speaking, there can be the following types of events: 1) validation (e.g., these events provide an opportunity for the interested party to inspect the proposed value and validate it); 2) pre-save (e.g., this event is raised just before saving changes to the store and can be substantially similar in intent and behavior to the "BEFORE" trigger in an SQL Server); and 3) post-save (e.g., this event is raised after saving changes to the store and can be substantially similar in intent and behavior to the AFTER trigger in an SQL Server). This type of BL runs in the CDP and hence can be run on any tier that the CDP is deployed on. Thus, when it runs on a client tier, it can be by passed by other applications (e.g., it does not run within the trust boundary).

Moreover, the business logic hosting 416 can invoke static/instance methods. The classes auto-generated for CDM types are partial classes. A type designer can complete these partial classes by adding additional methods on them, typically to implement logic that makes sense to a particular type or a set of types. Consider the following examples: person. GetOnlineStatus( ), where person is an instance of the Person type; emailAddr.Is ValidAddress( ), where emailAddr is an instance of SMTPEmailAddress type; etc. By its very nature, this kind of BL is not enforceable; for instance, it is up to the application to call IsValidAddress( ) to ensure validity. It is run on any tier that the CDP is deployed on. Thus, it does not run within the trust boundary when CDP is on the client tier.

Bindable behaviors are a coding pattern that allows type designers to create plug-in points for third-party extensions. The classic example is the type for an e-mail message. Different e-mail programs may be running on a given machine. Each program wants to use the common Message type, but each program also needs to customize the behavior of the SendMessage method. The type designer accomplishes this by defining a basic behavior for the SendMessage method, and allowing third parties to supply a pointer to the implementation. Bindable behaviors also run on any tier that CDP is deployed on. Thus, it does not run within the trust boundary when CDP is on the client tier.

Static service methods are BL written and deployed on the mid tier and remoted to the client tier. In other words, BL runs as a web service on the mid-tier. For example, consider a Calendar Management Service which provides services such as CreateAppointment( ), GetFreeBusy( ), etc. These services ("static service methods") are implemented using CDP and the web service is deployed on the mid-tier. The client tier has a web service proxy which is used by the application to invoke these services using a channel (discussed infra). This kind of BL can run on the mid-tier, and be within the trust boundary.

It is to be appreciated that the componentized architecture makes it possible for CDP to remain store agnostic to a certain extent. CDP features such as object cache, cursors, sessions, transactions, etc. utilize CDP level abstractions. Mapping to the underlying storage abstractions takes place in the O-R mapping and persistence layer. By rewriting the mapping logic, CDP can be implemented on different stores.

Figure 5:
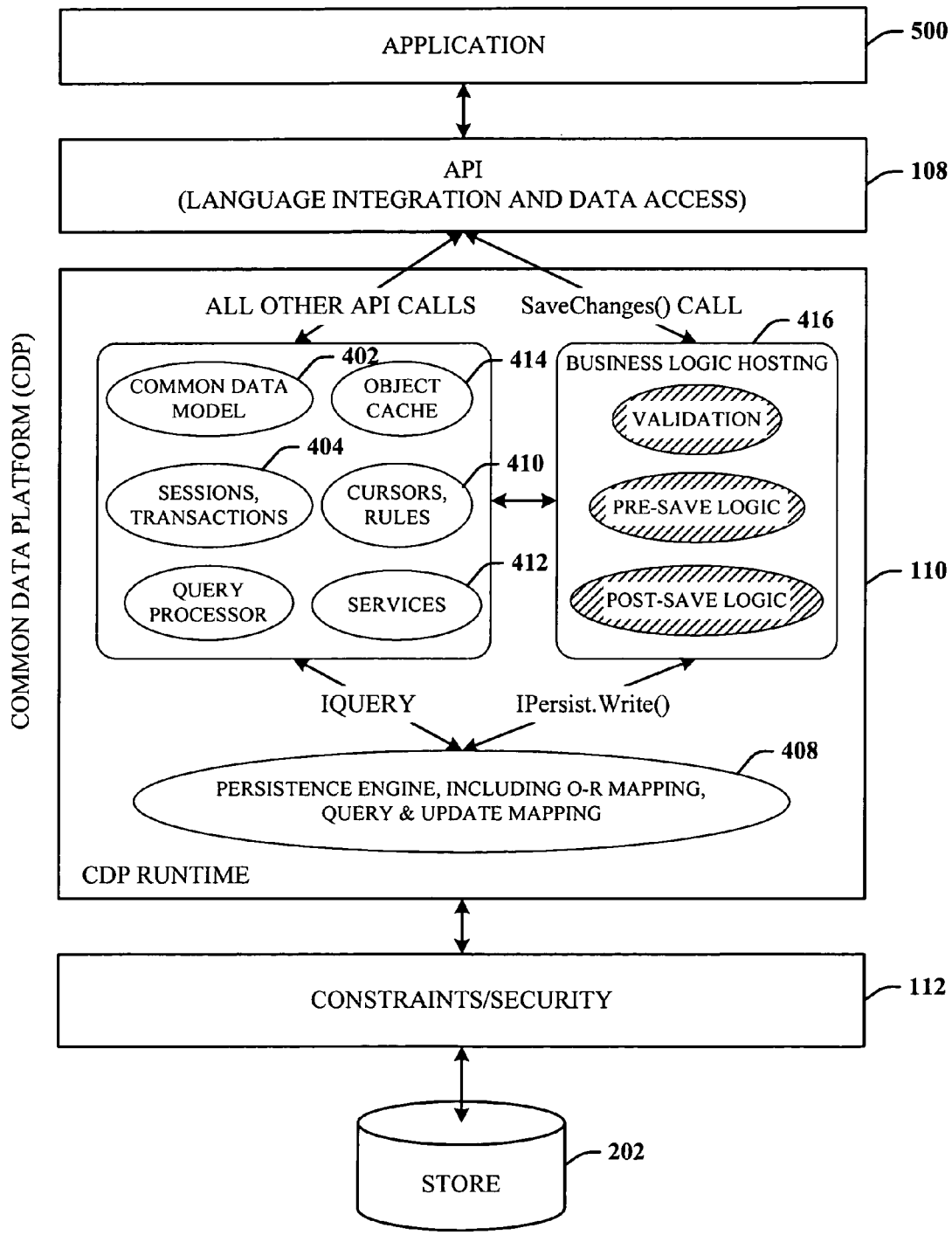
FIG. 5 illustrates the data flow within the various components of the CDP.

FIG. 5 illustrates the data flow within the various components of the CDP. It is instructive to examine the interaction of various components in response to method calls by an application 500 (similar to applications 206 and application 400) using the following example.

```
1. void AddToCart (String customerId, String productId)
2. {
3.    using (OrderData od = new OrderData( ))
4.    {
5.        ShoppingCart cart = od.ShoppingCarts.Searcher.Filter(
6.            "CustomerId={0}", customerId).GetFirst( );
7.        if( cart == null )
8.        throw new Exception("No shopping cart");
9.    Product product = od.Products.Searcher.Filter(
10.           "ProductId={0}", productId).GetFirst( );
11.       if(product == null) throw new Exception("Missing product);
12.       cart.Products.Add(product);
13.       od.SaveChanges( );
14.   }
15. }
```

This example adds an item to a persistent ShoppingCart. Imagine that this method is invoked as part of processing an ASP.NET web page, for example.

Line 3: Creating the storage context. The StorageContext is encapsulated by an OrderData object which is created by the application 500. The OrderData class can represent a table set type that is described in a CDM schema. The OrderData object creates a StorageContext object configured as necessary to interact with the store 202. The StorageContext's initialization code can be part of the runtime session and transactions component 404, which opens a connection to the store 202, and does the work necessary to initiate a session and create a transaction context. A security context is established in the constraints/security component 112. Finally, an instance of the StorageContext is returned by the API 108 to the application 500. In the 2-tier case, getting StorageContext results in a connection to the store 202. It is to be appreciated that a connection in a 3-tier deployment can be slightly different.

Line 5: Query. The right side of the expression in line 5 is an OPath query. The Persistence and Query Engine 408 exposes a rudimentary interface with methods to retrieve objects based on a CDM query. The CDM Implementation in the CDM 402 calls a method with the specified OPath. The persistence and query engine 408 maps the query into SQL and sends it across the wire as a TDS payload. The constraint/security component 112 ensures that security is applied properly and that the application/user sees only the data that they are allowed to see. The store executes the query and returns the results back to the CDP runtime 110. The CDM 402 and persistent/query engine 408 work together to hydrate objects from the TDS results, and these objects are placed in the object cache 414 (e.g., the session cache). The result is that the API 108 returns a ShoppingCart object to the application 500.

Line 9: Query. Neither this query nor the previous one has resulted in any cursors being created (the GetFirst( ) method essentially applies to a "top 1" clause to the query). However, if the query required a cursor to be created, then the cursors/rules component 410 performs this operation.

Line 12: Update. The ShoppingCart object in the object cache 414 is updated with the specified Product.

Line 13: Flush Changes. The implementation of SaveChanges( ) on the OrderData object calls SaveChanges( ) on the encapsulated StorageContext object. StorageContext.SaveChanges( ) is part of the business logic hosting component 416. This involves the following steps. First, pre-save logic is run. Then, the validation code is run, followed by post-save processes. The validation code is hooked into an event defined by the CDP API 108. Note that in another implementation, the validation code can be hooked to the setter for the object. Next, pre-save code is run. This code is hooked into an event defined by the CDP API 108. Write changes to the store. First, the hosting component 416 works with the object cache 414 to get a change vector which contains all changes made within this storage context. The persistence engine 408 exposes an interface called IPersist, which is a rudimentary interface with methods such as Write (<change Vector>), etc. The hosting component 416 gets an IPersist from the persistence engine 408 and calls IPersist.Write( ) with the change vector. The persistence engine 408 maps the write request into the appropriate SQL update (either the actual UPDATE statement or a stored procedure call) and uses this to write the changes to the store 202. During this process, the constraints/security component 112 ensures that appropriate security enforcement is done. It also runs any constraint logic. Finally, post-save code is run. This code is hooked into an event defined by the CDP API 108.

Note that running of business logic may result in changes to the objects in the cache 414. These changes are persisted in the store 202 by a call to myStorageContext.SaveChanges( ), which ensures that the business logic 416 is not bypassed. Multiple ISVs (Independent Support Vendors) may want to run logic on data changes, in which case they hook their handlers to the event and the handlers called in FIFO (First In/First Out) order by the CLR. In this example, the business logic 416 hosts ISV validation, pre-save, and post-save logic.

Figure 6:
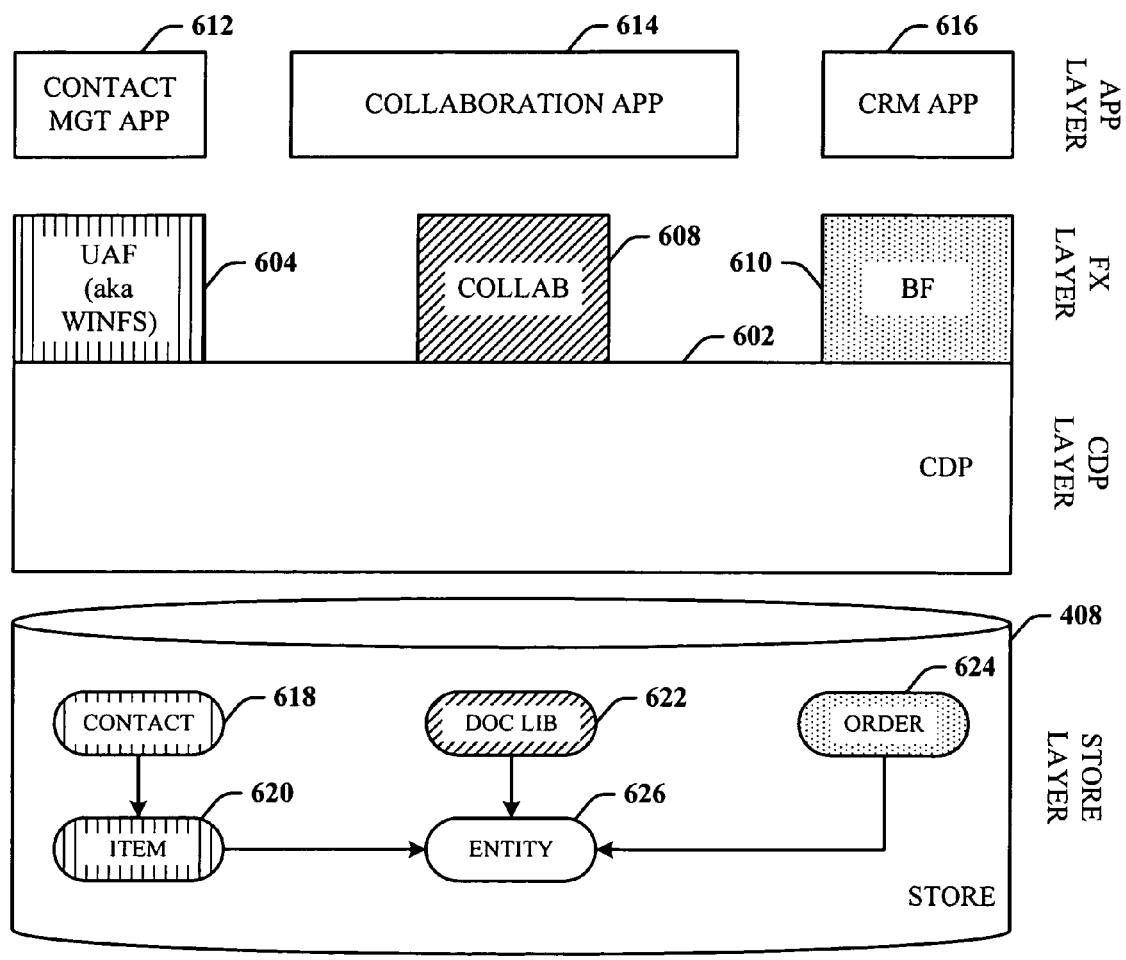
FIG. 6 illustrates the various frameworks that can be implemented with the CDP.

FIG. 6 illustrates the various frameworks that can be implemented with the CDP. The CDP is a data platform which is designed to be usable across various specialized vertical domains—such as user data, LOB data, etc. CDM provides a domain agnostic data model which is rich enough to express domain specific structure and semantics but at the same time, is generic enough to be usable across different domains. Various CDP features are based on CDM and hence are available across applications of all domains.

The universe of all applications written against the CDP can be divided into the following three classes:

1. Frameworks: A framework uses extensibility mechanisms provided by the CDP in order to customize CDP for a particular domain. A framework adds value to CDP with type specializations and additional services. However, the programming model exposed to the application is the CDP programming model; in particular, applications still use data classes, StorageContext, StorageSearcher, and the CQL. A database-based file storage system can be an example of a framework on top of CDP which is customized for user data domain.
2. Vertical Platforms: A separate layer on top of CDP with its own APIs, abstractions, and data model. It hides the CDP and exposes an entirely different programming model to the applications. For example, an application utilized in conjunction with email can use CDP, but expose Email Object Model for its users.
3. "Regular" Applications: Just a CDP application meant to accomplish a specific set of tasks. It does not specialize any CDP type, or expose a programming model, or use any framework or a vertical platform.

Vertical Platforms and "Regular" Applications are just code; they can use CDP any way they want without passion or prejudice. Frameworks are a little different; since they add value to CDP without hiding it from the application, they can adhere to the following rules:

1. The framework data model is identical to the CDM, or is a simple, well documented specialization of the CDM. It may define new types, but these types are ultimate-supertyped by Entity.
2. The framework may define additional constraints on existing CDM types and/or author new constraints using the CSDL. In other words, constraints must be expressed by using the CDM methodology for constraint definitions.
3. Frameworks usually do not expose their own query language; even if they do, it can be in addition to, not instead of, CQL.
4. Frameworks usually do not expose their own programming model; even if they do, it can be in addition to, not instead of, CDP API.
5. Frameworks provide additional specialized services on top of the CDP. These services may be implemented as CDP business logic or as additional helper classes and methods.

It is to be appreciated and understood that all of the above rules are intended to ensure that the data saved into CDP by a given framework can be accessible to all applications regardless of whether an application is using this framework or not.

FIG. 6 illustrates three (3) frameworks on top of a CDP layer 602: a user application framework (UAF) 604 (e.g., a database-based file storage system, WinFS, etc.), a collab framework 608 (such as WSS), and a business framework 610 (BF) (e.g., a LOB framework). The data belonging to each framework is shown in the same pattern as the framework box. For example, the UAF 604 has data a contact 618 and an item 620; the collab framework 608 has data doc library 622; and the BF 610 has data an order 624. Notice that all these types are ultimate-supertyped to Entity 626.

FIG. 6 also illustrates three (3) applications in the application layer: a contact management application 612, a collab application 614 (such as an email application), and a customer relationship management (CRM) application 616. The contact mgmt application 612 works entirely with data from the UAF 604; the CRM application 616 works with data from both the UAF 604 and the BF 610; and the collab application 614 works with data from all three frameworks (e.g., UAF 604, collab framework 608, and the BF 610).

Figure 7:
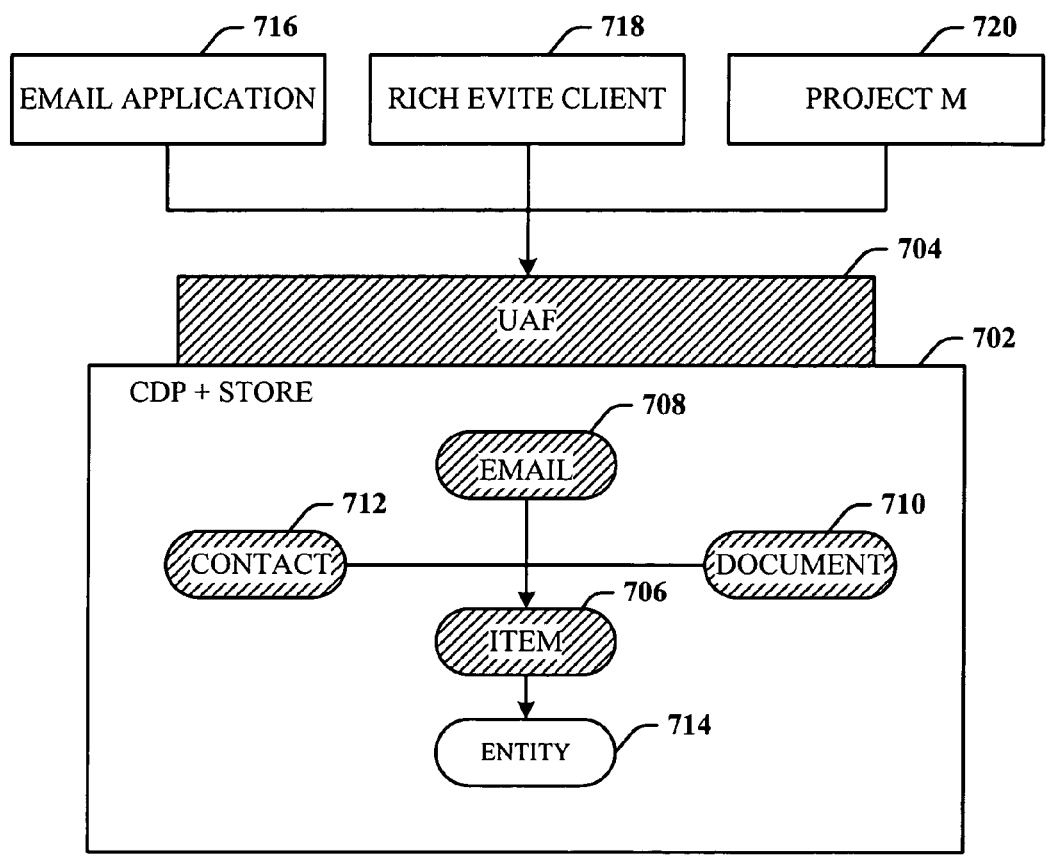
FIG. 7 illustrates a common database-based file storage system scenario allowing multiple applications to share data.

FIG. 7 illustrates a common database-based file storage system scenario allowing multiple applications to share data. In other words, FIG. 7 illustrates multiple applications utilizing a single framework. A CDP component and store component 702 (depicted as the CDP+store in FIG. 7) can be utilized to be a single data platform for an operating system which is leveraged by any and all applications. The advantages (as stated supra) are rich modeling, data transparency, and data sharing. These advantages can be described in more detail below.

The CDM provides a flexible modeling environment which can be used to describe types required by a diverse set of applications and scenarios. For example, user data (e.g., documents, files, photos, music, . . . ), LOB data (e.g., Customers, Orders, Order Details, . . . ), PIM data (e.g., contacts, email, calendar, tasks, . . . ) can all be modeled utilizing the CDM. This kind of rich modeling which spans structured, semi-structured, and unstructured data and also spans vertical domains makes it possible for a single application to work with different kinds of data using common abstractions and query language. In other words, CDP can be used as one store.

The CDP can be utilized as a single data platform that is leveraged by all applications. Moreover, the data stored using CDP can be available to all applications to operate on (e.g., subject to security policies). Consider the following: each application stores data in a format that is opaque to other applications except the application itself (e.g., the one that stored the data). To give just two examples: the contents of an email mailbox is opaque to all other applications except the email application; a CRM application has an elaborate set of schemas which it overlays on top of tables to create abstractions such as Customer, Case, and so on—thus making the notion of a "Customer" opaque to all other applications (e.g., unless the applications know the schema used by the CRM application).

Clearly, there is data in the email application which is conceptually similar to the data stored by a CRM application—an example is Contact information. As far as the user is concerned, a Contact is a Contact is a Contact; from this perspective, it is difficult to understand why the same Contact information is stored twice, once in the CRM and once in the email mailbox. The issues here is not just redundant storage, but all the anomalies that this implies—making updates happen in both places, reconciling deletes, and ensuring inserts in both places, and so on. Consider what happens when both the email application and CRM application are built on the CDP store 702. Using the CDM, the Contact type can be derived from the Entity type and its structure becomes transparent to both the email application and the CRM application. Thus, as long as the two applications agree on the schema for a type, disparate applications can use each others' data without being aware of each others' existence. Because CDP offers a common query model, the CRM application (for example) can query for Contact data regardless of whether a particular instance of Contact "belongs" to it or not.

The combination of rich modeling, data transparency and the platform-framework architecture enables many sharing/interop scenarios involving combinations of multiple applications and frameworks. It is to be appreciated that the term sharing can refer to an application that can utilize the data as long as it is stored in the CDP regardless of which application stored it and/or which framework was utilized to store it.

In particular, FIG. 7 illustrates a common UAF scenario where multiple applications share data, which in this case is a set of UAF types derived from Item 706. The CDP and store 792 can include a set of UAF types related to a UAF framework 704. The set of UAF types can derive from an Item 706, wherein the set can include an email 708, a document 710, and a contact 712. It is to be further appreciated that the Item 706 can be derived from an entity 714. A plurality of applications can be utilized in conjunction with the CDP and the UAF framework 704, such as, but not limited to an email application 716, a rich evite client 718, and a project M 720. It is to be appreciated and understood that no restriction is place about the tier in which the application, CDP, UAF reside in. For instance, one of the applications in FIG. 7 can be executed and/or run in the middle tier (e.g., a collab application).

Figure 8:
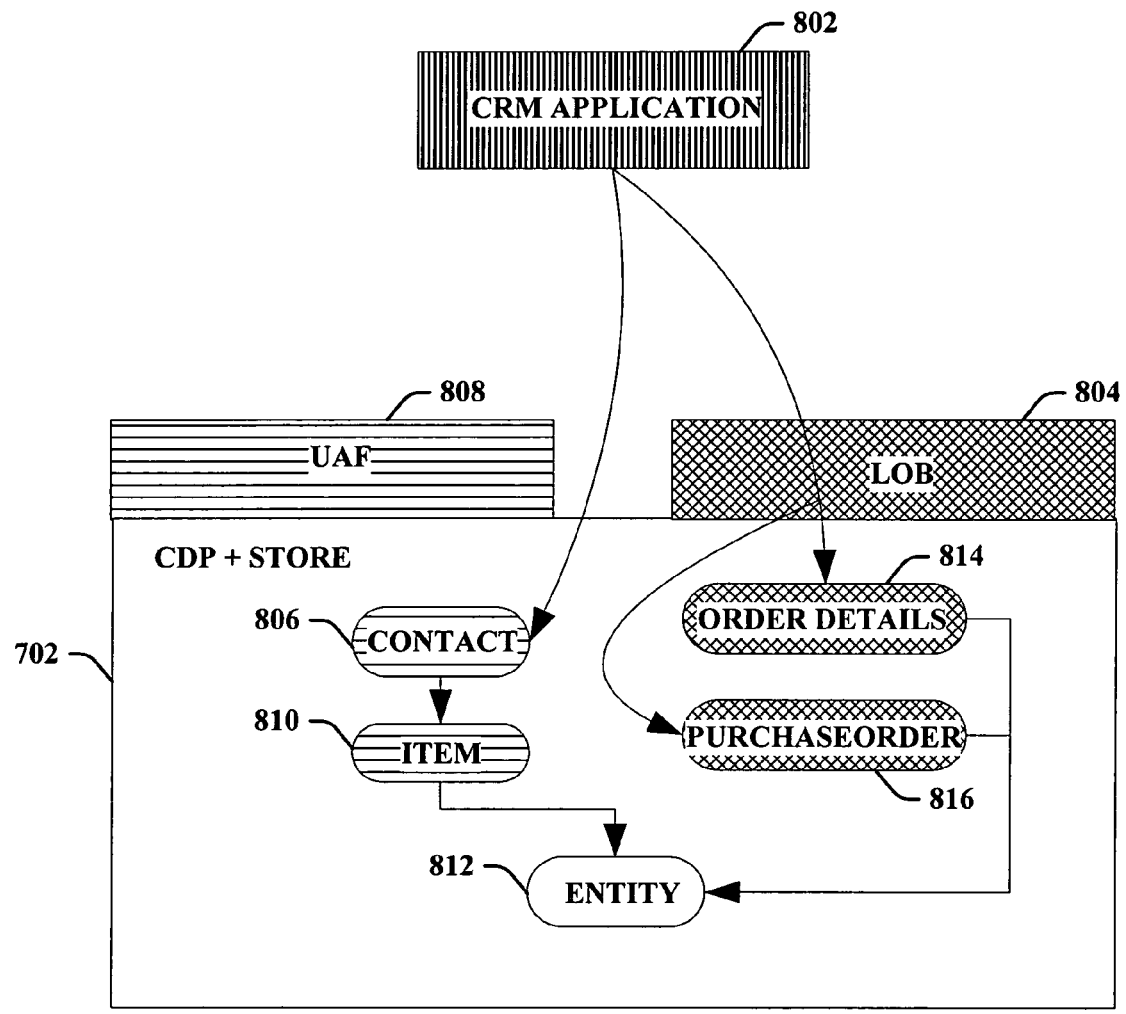
FIG. 8 illustrates a single application utilizing multiple frameworks in accordance with the CDP and associated architecture.

FIG. 8 illustrates a single application utilizing multiple frameworks in accordance with the CDP and associated architecture. The CDP and store 702 can provide a single data platform for an operating system which is leveraged by all applications. A CRM application 802 which can be primarily written over a LOB framework 804, can utilize contact data 806 associated with a UAF framework 808. It is to be appreciated that the CRM application 802 typically utilizes data associated therewith such as, but not limited to, an order details 814, and a purchase order 816. The CRM application 802 can utilize CDP level abstractions when utilize the UAF data (e.g., the contact data 806, an item 810, an entity 812, etc.). In other words, the CRM application 802 need not utilize UAF framework 808 methods. Furthermore, it is to be appreciated and understood that the CRM application 802 can reside on any tier.

Figure 9:
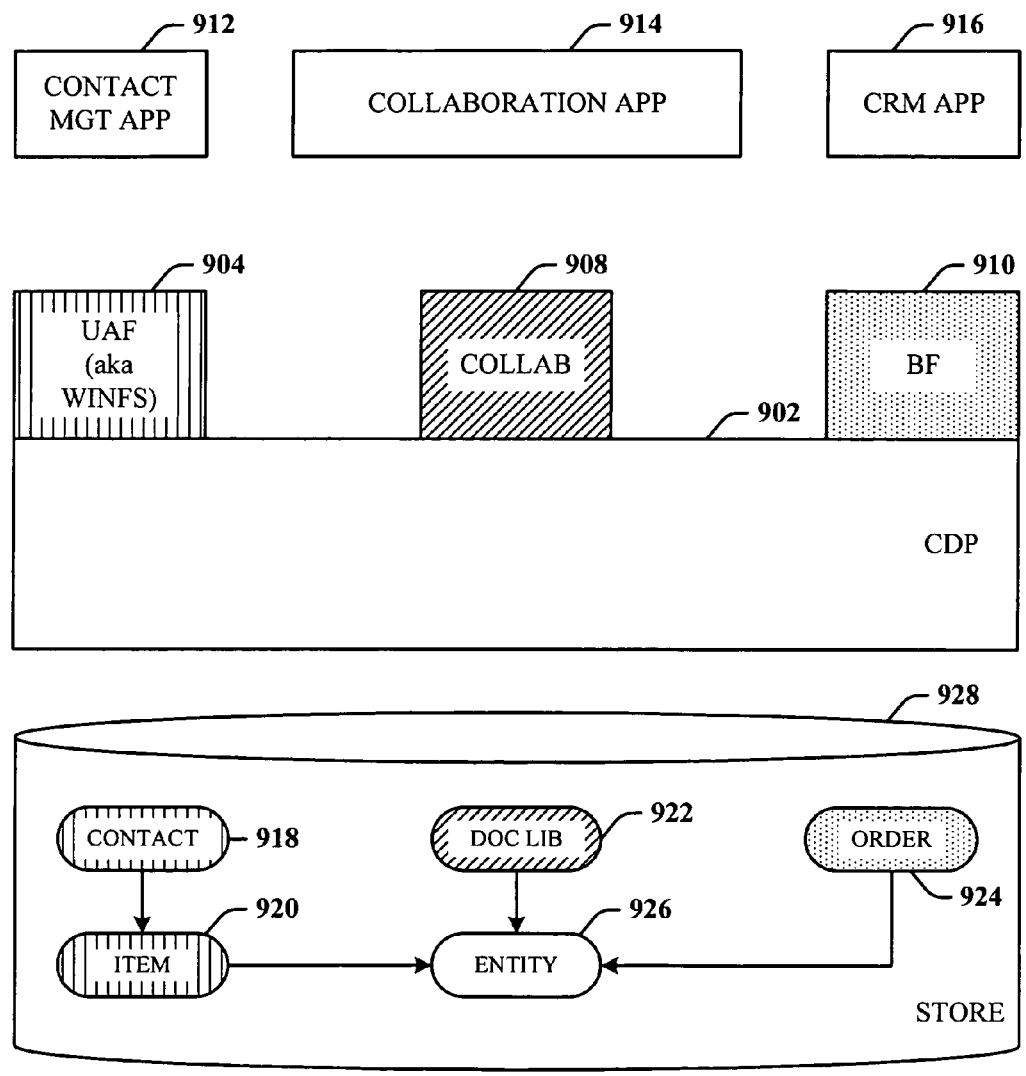
FIG. 9 illustrates the CDP sharing data with multiple applications associated with a plurality of disparate frameworks.

FIG. 9 illustrates the CDP sharing data with multiple applications associated with a plurality of disparate frameworks. FIG. 9 depicts three frameworks, a UAF framework 904, a collab framework 908, and a BF framework 910 on top of a CDP 902. A plurality of applications can utilize a combination of framework level and CDP level programming. In particular, a contact management application 912, a collaboration application 914, and a CRM application 916 can utilize a combination of the framework level and CDP level programming. The CDP 902 provides the plurality of applications associated with a plurality of disparate frameworks to share data within a store 928.

Specifically, there are various manners in which the pluralities of applications interact with data. The contact management application 912 can utilize CQL to query for a contact 918; it can utilize UAF 904 methods such as item level move, copy, contact.GetBestEAddress( ), etc. The contact management application 912 can further utilize core CDP runtime classes such as, but not limited to, StorageContext, StorageSearcher- and CDP data classes (e.g., the contact class and associated getters and setters).

The collab application 914 can utilize CQL to query for Contacts 918, any documents in the doc lib 922, and perhaps even an order 924. The collab application 914 need not know the existence of the UAF 904 and/or the BF 910 to do such queries—it can be done purely at the CDP level without utilizing any special code written by the other frameworks. It utilizes operations specific to collab framework 908 to manipulate the doc lib 922 such as AddDocumentToDocLib (<document>, <docLib>), etc. The collab application 914 can further utilize the CDP level classes such as StorageContext, StorageSearcher, Contact, Order, DocLibrary, and associated setters and getters.

The CRM application 916 utilizes CQL to query for all orders by a given contact. It is to be appreciated that the CRM application 916 can do this query without any knowledge that the contact was actually created utilizing UAF 904. It manipulates Orders utilizing methods and services provided by the BF 910 (e.g., FindShipStatus(<order>)). It can further utilize CDP level classes such as StorageContext, StorageSearcher, Contact, Order, and associated setters and getters.

When sharing with non-CDP stores, it is important to note that the CDP does not employ a provider model whereby arbitrary data sources can appear as CDP stores. When a CDP/Framework application wants to work with data in a non-CDP store, it can employ two options: 1) use the Sync Adapter architecture (which is part of UAF) to sync this data into the CDP store; and 2) build custom logic to integrate with the non-CDP store.

Figure 10:
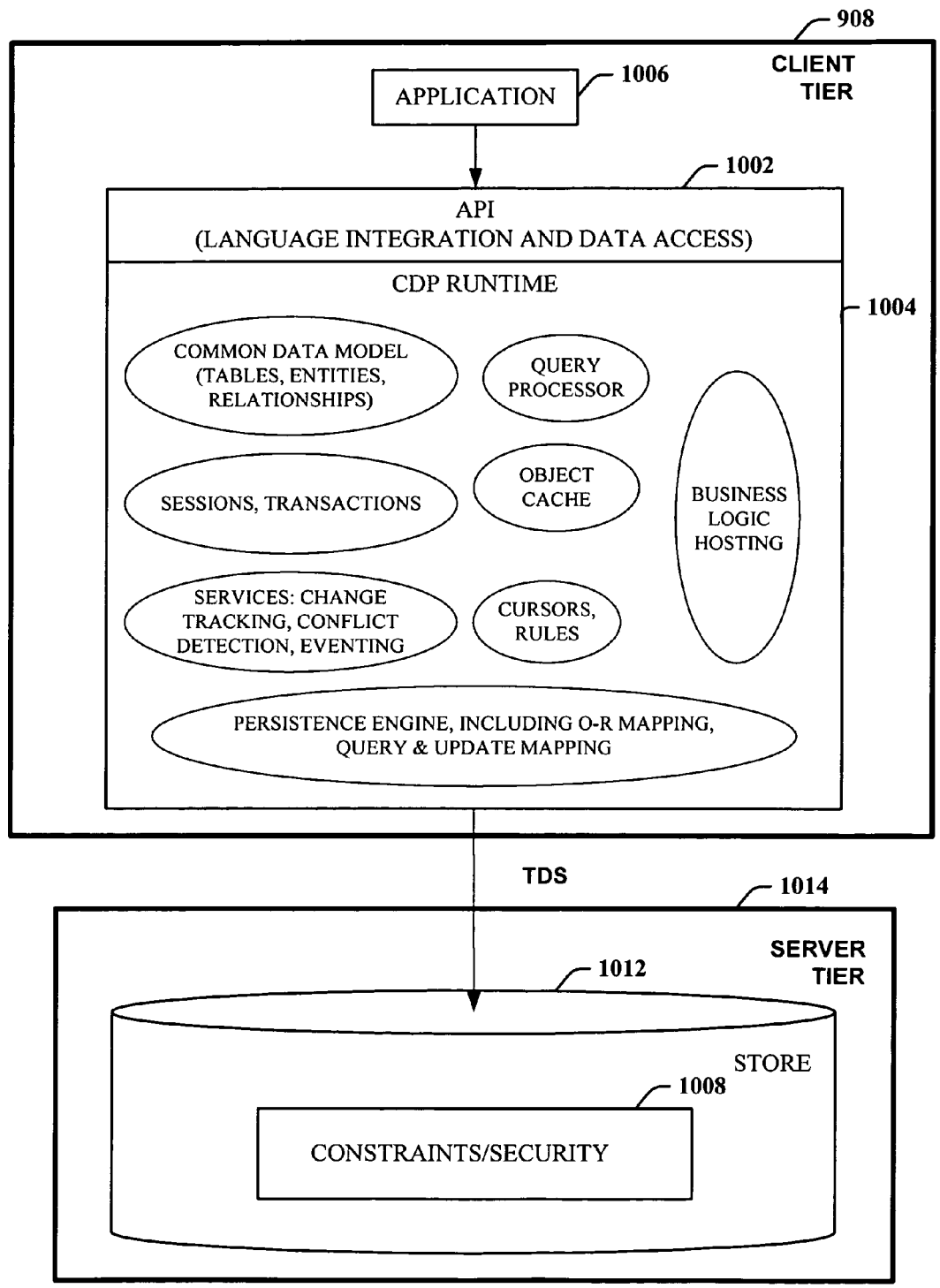
FIG. 10 illustrates a two-tier deployment of the CDP to facilitate data management.

FIG. 10 illustrates a two-tier deployment of the CDP. The various components that comprise the CDP are, in sense, mobile. With certain limitations, they can be deployed across different process and machine boundaries, resulting in 2-tier, 3-tier, and N-tier (where N is an integer greater than or equal to 1) configurations. It is to be appreciated and understood that although a 2-tier deployment is illustrated, the subject innovation is not so limited and that any number of tier configurations can be employed.

In particular, a CDP API 1002 and a CDP runtime 1004 can both be in the application process associated with an application 1006. Thus, the CDP components (e.g., the CDP runtime 1004, the API 1002, and a constraints/security 1008) can exist in various tiers. For instance, the API 1002, the CDP runtime 1004, and the application 1006 can exist in a client tier 1010, wherein the components therein can exist in their own process/machine boundary. Additionally, a store 1012 and the constraints/security 1008 can exist in a server tier 1014, wherein the components therein can exist in their own respective process/machine boundary. It is to be appreciated that the constraints/security 1008 can be hosted in the store process while the rest of the CDP components can be in the client process. This is a prime example of how the CDP components can be considered to be mobile.

Figure 11:
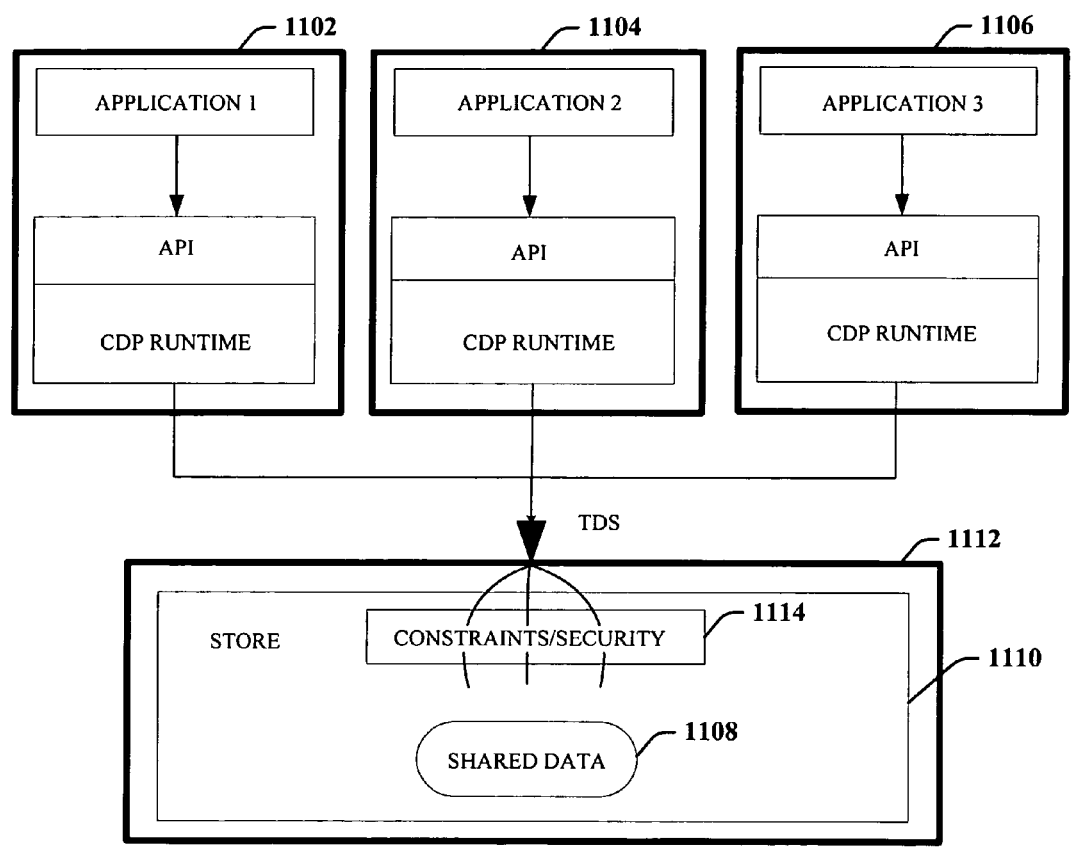
FIG. 11 illustrates a two-tier deployment with shared data to facilitate data management.

FIG. 11 illustrates a two-tier deployment with shared data in accordance with one aspect of the subject innovation. A first configuration, discussed below, is when multiple applications share the same data. This is not to say that the applications have to share the data; rather, it is saying that any application's data is available to other applications. Note also that the availability of data is in the context of applications, not users—thus, this is distinct from the notion of user credentials. The constraint/security module of CDP runtime can handle this regardless of the application.

An application can interact with an API and a CDP runtime, wherein various applications can exist with each respective component such that each application, API, and CDP runtime can have its own machine/process boundary illustrated as boundary 1102, boundary 1104, and boundary 1006. For the sake of brevity, three applications (e.g., application 1, application 2, and application 3) are illustrated, yet it is understood that any number of applications can be employed. The applications can access a shared data 1108 within a stare 1110 within its own process/machine boundary 1112. It is to be appreciated that the constraints/security 1114 is enforced during such sharing of data between disparate applications.

This is configuration is very important in many user-scenarios; for example, this is the cornerstone in the database-based file storage vision of schematized user data which can be leveraged by ISVs to build intelligent, data aware applications. Project M can rely on this to accomplish its vision of being a universal canvas for all user data. This is the primary configuration supported by the CDP.

Figure 12:
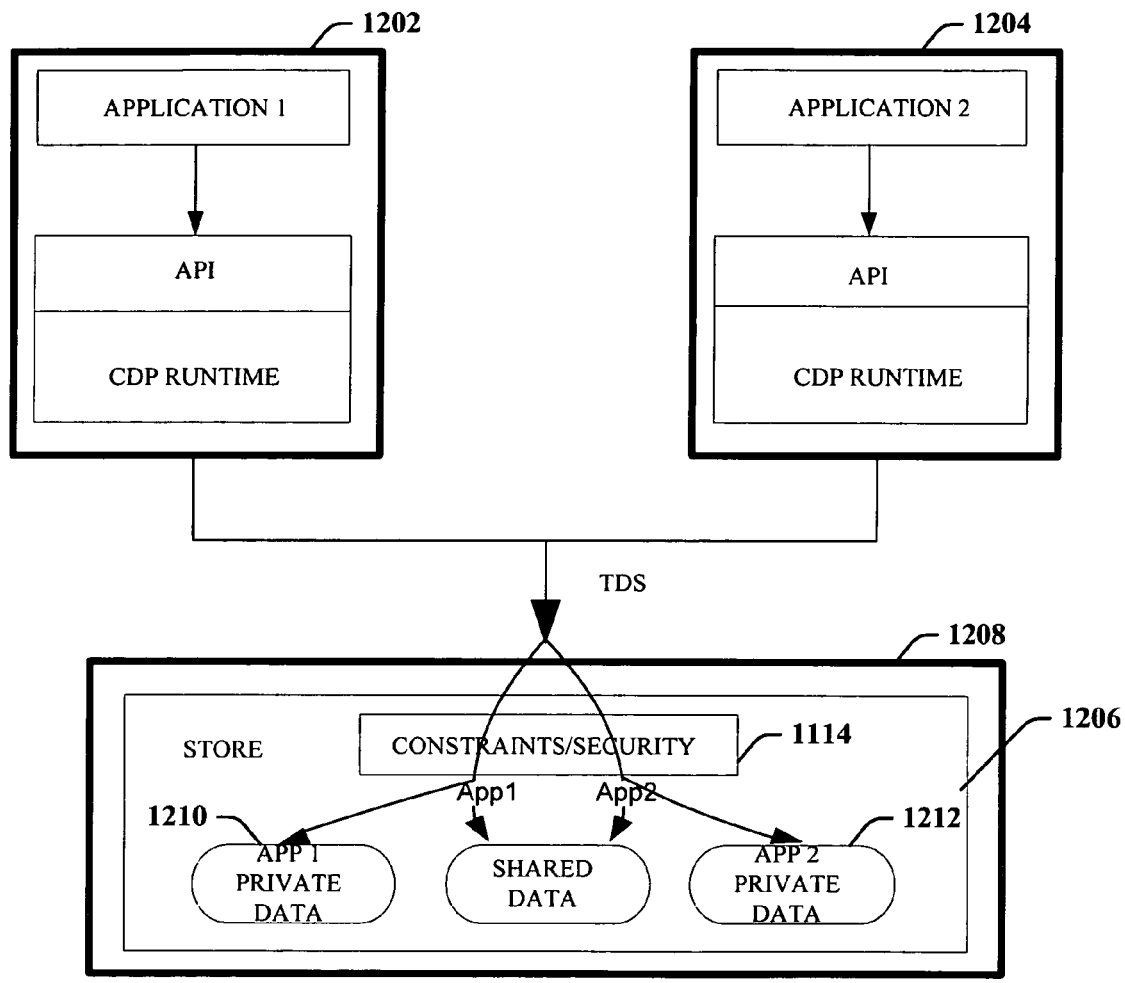
FIG. 12 illustrates a second configuration such that an application has private data that it does not want seen and/or utilized by other applications.

FIG. 12 illustrates a second configuration such that an application has private data that it does not want seen and/or utilized by other applications. In other words, there is a two-tier deployment involved with private data. There are many user and ISV scenarios which demand the notion of application private data. For instance, if an application decides to store its configuration data (e.g., ini file equivalents) in a database-based file storage system, it is desirable for this to be private to the application. Many times, there is a requirement for partial privacy-reads are allowed, but writes are not. For instance, in an email application, it would be desirable to display a mailbox, but would reserve the right to itself to modify the mailbox.

In a 2-tier deployment, the CDP has limited support for this configuration. There is no reasonable support for application level security in the SQL Server store; consequently, a piece of data may not be marked as private to a given application in the strict sense of preventing data access. However, this situation can be partially supported in the following ways:

The application uses its own types, and puts its types in a separate namespace and creates private assemblies for the data classes resulting from those types. Since all CDP level access to the instance data belonging to this schema is through these assemblies, other applications will not have access to the corresponding classes.

The application creates its own private CDP store (e.g., a set of entities in CDP over which a StorageContext can be created) whose name is not published to other applications.

Through the use of documentation.

It is to be appreciated that applications can choose some or all of the above methods to have private data.

It can be noted that the CDP architecture by itself may not create an impediment towards implementing a true notion of private data. It is thus conceivable that when application level security becomes available in the underlying platform, CDP can easily expose it. Note also that in many cases, the "private data requirement" arises not because of a genuine need to limit visibility but because of the need to enforce application specific business logic on the data. For instance, local mailboxes created by an email application have a Calendar folder; the rule is that only Calendar items can be placed in this folder. The email application may not care whether another application (such as a disparate brand email application) can see/modify its mailbox or not as long as this rule is enforced. The CDP architecture provides enforcement of all business logic as long as all applications come through the CDP layer. It is to be appreciated that private application data is supported in 3-tier deployments because the middle tier can enforce this.

Continuing with FIG. 12, there is illustrated a machine/process boundary 1202 with an application that interacts with an API and a CDP runtime and a machine/process boundary 1204 with an application that interacts with an API and a CDP runtime. For the sake of brevity, only two applications are illustrated, but it is to be appreciated that any number of applications can access shared data 1210 and/or access respective private data (e.g., application 1, private data 1210; and application 2, private data 1212) within a store 1206 within its own machine/process boundary 1208.

Figure 13:
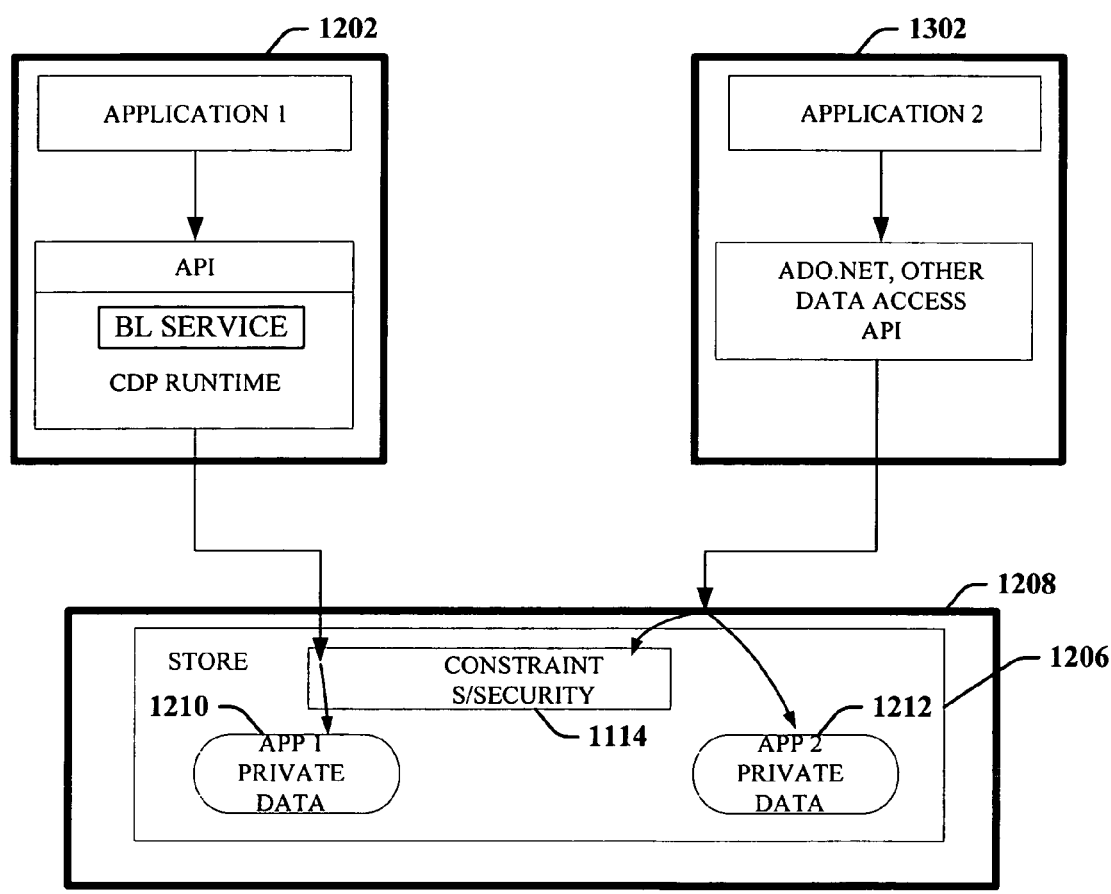
FIG. 13 illustrates a third configuration of interest such that another application accesses the store directly.

FIG. 13 illustrates a third configuration of interest such that another application accesses the store directly. In other words, there is a two-tier deployment with a direct store access. An Application 2 within a machine/process boundary 1302 can access the SQL store 1306 directly, perhaps through ADO.NET, for example, or another data access API. For example, large IT (Information Technology) shops which have existing SQL applications are unlikely to eliminate it and move en masse to a CDP-based application. Rather, migration to CDP on a piecemeal basis can be implemented. Since zero-downtime and stability are key issues in a production environment, it is likely that the CDP applications can continue to run side-by-side with the SQL application for some time. Since CDP offers flexible, non-prescriptive O-R (object-to-relational) mappings, the CDP application can be deployed over existing schema. The CDP architecture allows direct SQL access, naturally. This is because 'Application 1 Data' is simply a set of tables and there is nothing to prevent Application 2 from accessing it directly, as long as it has the appropriate permissions.

Note the following consequences for application 2:
1) It may not have access to CDP services (or any services built by a framework on top of CDP).
2) Specifically, it does not have the benefit of the CDM—so it has to figure out the tabular representation and issue queries/updates directly at this level.

Note the following consequences for application 1:
1) The business logic in the BL service(s) is effectively bypassed by application 2.
2) Some constraints—e.g., those that are not implemented as Triggers/DRI (declarative referential integrity) are also bypassed by application 2.

In this particular deployment, it is the responsibility of the application designers and/or deployment administrators to make sure that application 2 has its own logic to enforce constraints, etc. so that the right thing happens.

Figure 14:
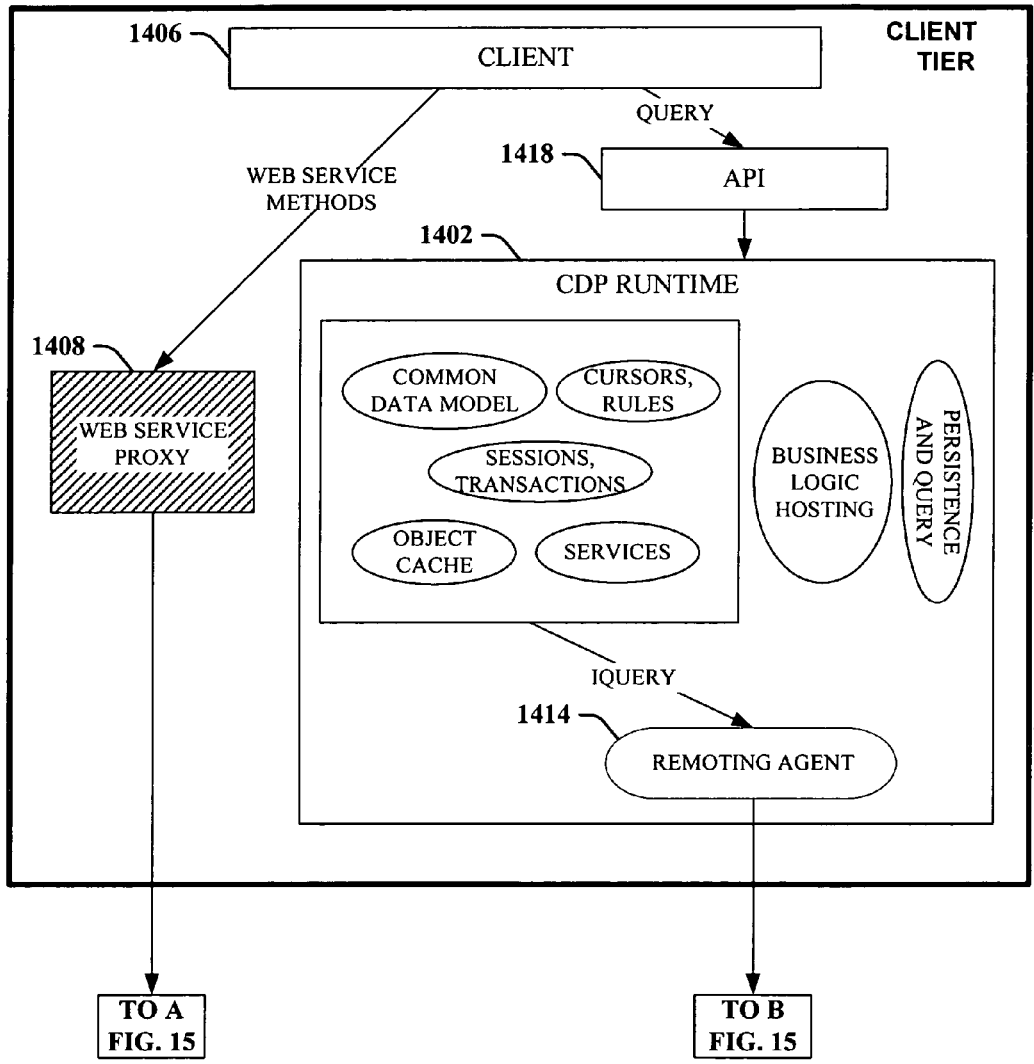
FIG. 14 illustrates a three-tier deployment configuration of the CDP components.
Figure 15:
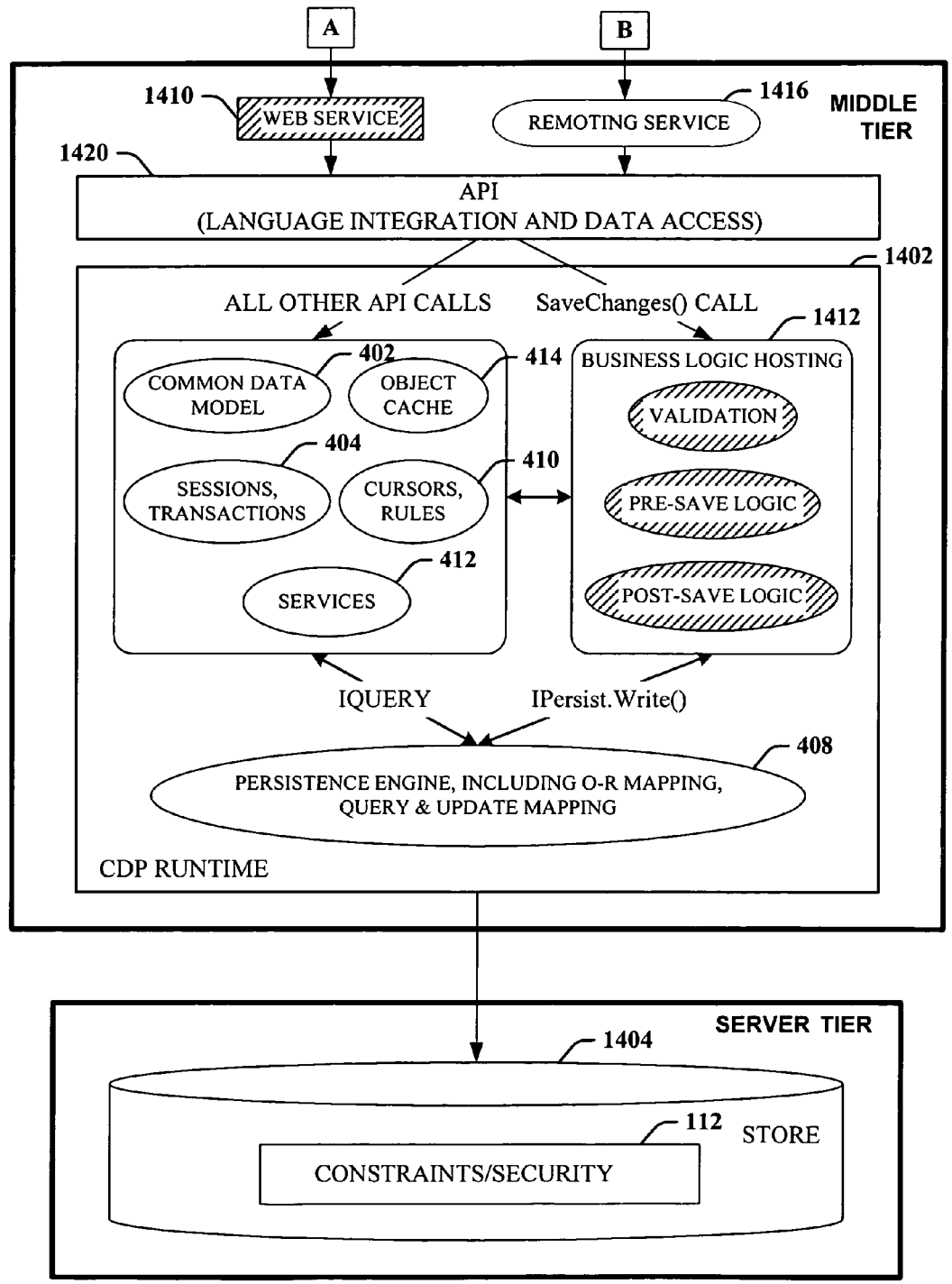
FIG. 15 illustrates a three-tier deployment configuration of the CDP components.

FIG. 14 and FIG. 15 illustrate a three-tier deployment configuration of the CDP components. The various CDP components can be deployed in a 3-tier configuration. In this configuration, CDP runtime 1402 is present on both the client tier and the middle tiers (shown in FIG. 15). The application sits on the client tier and a store 1404 sits on the server tier (illustrated in FIG. 15). Application logic can relate to two claimants in FIGS. 14 and 15: the first is a client 1406. The second are a web service proxy 1408, a web service 1410 (seen in FIG. 15), and the business logic hosting 1412 (seen in FIG. 15) (e.g., validation, pre-save logic, and post-save logic). While the client 1406 is an application and hence, the logic contained within it can be legitimately called as "Application Logic", this is not what is referred to. Rather, the reference is to the logic contained within the web service proxy 1408, the web service 1410, and the business logic hosting 1412. This is code written by the ISV and meant to be deployed on the middle tier; thus, in a very real sense, this is a mid-tier "application. Application logic can reside on both client and middle tiers. Depending on where the application logic runs, there are several possible scenarios which are considered below.

Before moving to consideration of the scenarios, it is to be appreciated that the topic of multi-tier deployment is closely related to the ways in which application actions are remoted across tiers. The term remoting can encompass the following three general approaches to remoting application level or CDP-service level operations across tiers:

1. Application level remoting via web services: in this scenario, the application logic resides on the middle tier and is exposed to the client as remoted static methods. This is discussed in detail infra.
2. Implicit CDP-service call remoting: CDP API calls such as FindAll( ), FindOne( ), SaveChanges( ) are sent to the middle tier implicitly via the remoting agent and remoting service components. This architecture is described infra. Moreover, the subsequent sections have examples that describe how this works.
3. Explicit, disconnected remoting: CDP API defines a programming pattern whereby the application explicitly defines when the tier-crossing operations should happen. If this operation resulted in data retrieval, then the retrieved data is cached on the client tier. This pattern is usually referred to as the "disconnected mode" (discussed infra).

In particular, FIG. 14 and FIG. 15 illustrate the application logic running on the middle-tier (e.g., a Web service). The primary scenario for mid-tier deployment is the case where application logic runs exclusively in the middle tier; the client 1406 invokes this logic through a web service mechanism (e.g., the web service proxy 1408 and web service 1410). It is to be appreciated that the security engine on the server tier can be hosted in the middle tier CDP process. In a 2-tier deployment, the CDP calls are processed by the CDP runtime 1402 within the client process; the runtime contacts the server when necessary. In a 3-tier deployment, some CDP calls are processed locally (via client tier) and some are processed remotely (via middle tier). Moreover, still others can be processed in both places. A 3-tier deployment defines a methodology for remoting the appropriate calls.

A remoting agent 1414 on the client tier that is a component that can use an channel (e.g., Indigo) to package and send requests to the CDP on the middle tier (this is the actual act of a remote procedure call). On the mid-tier sits a remoting service 1416 (seen in FIG. 15) which, appropriately enough, services these requests. This pattern is part of what is commonly known as the Service Oriented Architecture (SOA). A characteristic of SOA is that the different tiers communicate with each other by exchanging messages. CDP can utilize the Indigo infrastructure for this purpose The remoting service provides a set of data oriented services—such as "execute a query", "insert", "delete", "update", "create", "save", "get an Object given the key", "get the root key." In keeping with the SOA paradigm, these operations can be verbs within a SOAP message. Any action that the client tier wants to have executed on the mid-tier is expressed in terms of these simple verbs. These basic messaging verbs are abstracted into methods on 2 interfaces using facilities provided by Indigo; in fact, these are the IPersist and IQuery interfaces that were discussed supra. Thus, the remoting agent 1414 and remoting service 1416 together act as end points on an Indigo channel to remote the methods of IPersist and IQuery interfaces. It is to be appreciated and understood that the methods in IQuery and IPersist are "coarse-grained" in the following sense: they can be used to query for, or operate on, a large set of objects. For example: in response to the SaveChanges( ) method, the remoting agent 1414 issues IPersist.Write( ) once to the remoting service 1416 with the entire set of dirtied objects. Thus, interfaces between the client and middle tier are bulk-oriented and not chatty.

The following pseudo code example can be depicted to examine data/control flow across the various modules shown in FIG. 14 and FIG. 15, in response to method calls. It is to be appreciated and understood that the following is an example and the subject architecture is not so limited.

---

1. WinFSData wd =
   new WinFSData(@"\\CorpSvr01\SharedSchedule\AnilNori"))
2. ScheduleEntry s = wd.Items.FilterByType<ScheduleEntry>( ).Filter( "StartTime > @0", new DateTime(xxxx, 10, 29, 9, 0, 0)).GetFirst( );
3. s.DisplayName = s.DisplayName + "[important, please come!]";
4. ScheduleService ss = new ScheduleService(wd);
/* public bool CreateAppointment(ScheduleEntry appointment,

```
                  -continued
*                 string path)*/
5. if (ss.CreateAppointment(s, @"\\CorpSvr01\SharedSchedule\PCelis"))
6. {
7.   Console.WriteLine("Appointment created!");
8. }
```

In this example, the application queries the shared calendar for Anil Nori on the corporate intranet to get his calendar entry for Oct. 29$^{th}$, xxxx at 9 AM. This is represented by the ScheduleEntry object, which is a type derived from Entity (e.g., ScheduleEntry is part of the PIM Schema and represents an item in the user's schedule). It modifies the ScheduleEntry—appends the text "[important, please come!]" to the title of the appointment. It then invokes the CreateAppointment method on a web service (called ScheduleService) to put this modified ScheduleEntry into Pedro Celis' shared calendar. This code fragment illustrates several key points in a 3-tier deployment:

1. The client uses the local CDP runtime to query for store entities. The queries are executed on the mid-tier.
2. The query results are in the client tier CDP's session cache.

The entire "application logic"—including business logic, validation, etc.—are run on the middle tier by the web service and by CDP's BL hosting engine. This processing is triggered by a call to the CreateAppointment( ) method. The following is a detailed examination of the data flow between/across various modules.

Line 1: Creating a Storage Context. A StorageContext object (e.g., API 1418 on Client Tier) is encapsulated by a Data object which is created by the application and/or client 1406. The Data class represents a table set type that was described in a CDM schema. The Data object creates a StorageContext object configured as necessary to interact with the store 1404. The StorageContext's initialization code is part of a CDP runtime 1402 on the client tier.

Line 2: Query. The RHS of the expression in Line 2 is an OPath query. This query returns with at most one ScheduleEntry object—the first entry (e.g., Assume that there exists a precise definition of "first entry") at Oct. 29, 2004, 9AM. The CDP runtime 1402 on the client tier gets the IQuery interface on the remoting agent 1414 and calls ExecuteQuery (<Opath>) on it. The remoting agent 1414 can utilize an Indigo channel and sends this query to the remoting service 1416 on the middle tier. The query is mapped and executed just as in the two tier case and the results are returned to the client tier. There are two possibilities here:

1. Raw TDS results are returned from the Middle Tier to the Client Tier without hydrating the objects. The CDP runtime 1402 on the client tier then hydrates the objects.
2. If these objects already exist in the object cache 414, hydrated objects are returned to the Client Tier It is to be appreciated that that the entire OPath query is sent across the Indigo channel. For example, if the query was a "Find all objects of type ScheduleEntry" (that is, a FindAll( ) method invocation), then this entire query would be sent to (the remoting service 1416 on the mid-tier) in one SOAP message—not one message per object.

Line 3: Manipulating Client Tier Object Cache. Once the ScheduleEntry object is returned to the client tier, it is available for further manipulation within the session cache of the CDP runtime 1402 on the Client Tier. When the client 1406 changes the DisplayName property of ScheduleEntry object, this is processed entirely by the CDP runtime 1402 on the Client Tier.

Line 4: New-ing a web service proxy on the Client Tier. Presumably, the client 1406 has already added a reference to the appropriate asmx (or the Indigo equivalent) during design time. Line 4 can create an instance of the web service proxy object on the client. This call is serviced entirely by the Web Service Proxy 1408.

Line 5: Calling the Web Service Method. The CreateAppointment( ) is one of the methods remoted by the web service 1410 on the mid tier. This method takes a ScheduleEntry object and a CDP connection string; it uses this information to create a ScheduleEntry object within a StorageContext defined by the connection string. Inherent within this write operation is the running of appropriate business logic and validation logic. This method is packaged by the web service proxy 1408 and sent via a SOAP message thru the Indigo channel to the web service 1410 on the mid tier. The web service 1410 implements this method via calls to a CDP API 1420 on the middle tier just as if it were any other application. The key thing to note here is that the entire logic for CreateAppointment( ) is run on the mid-tier.

Figure 16:
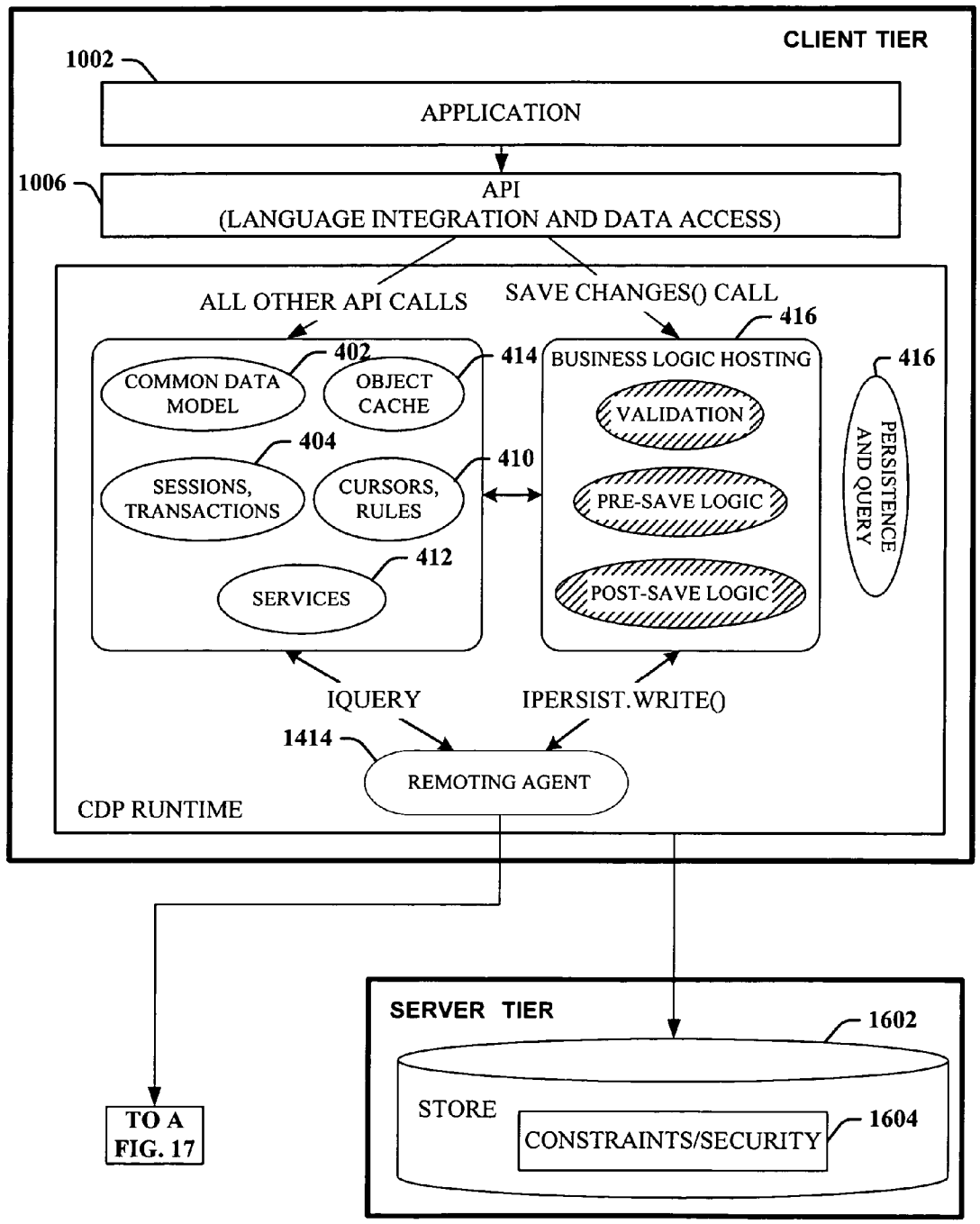
FIG. 16 illustrates a diagram of the application logic running on both the client tier and the middle tier.
Figure 17:
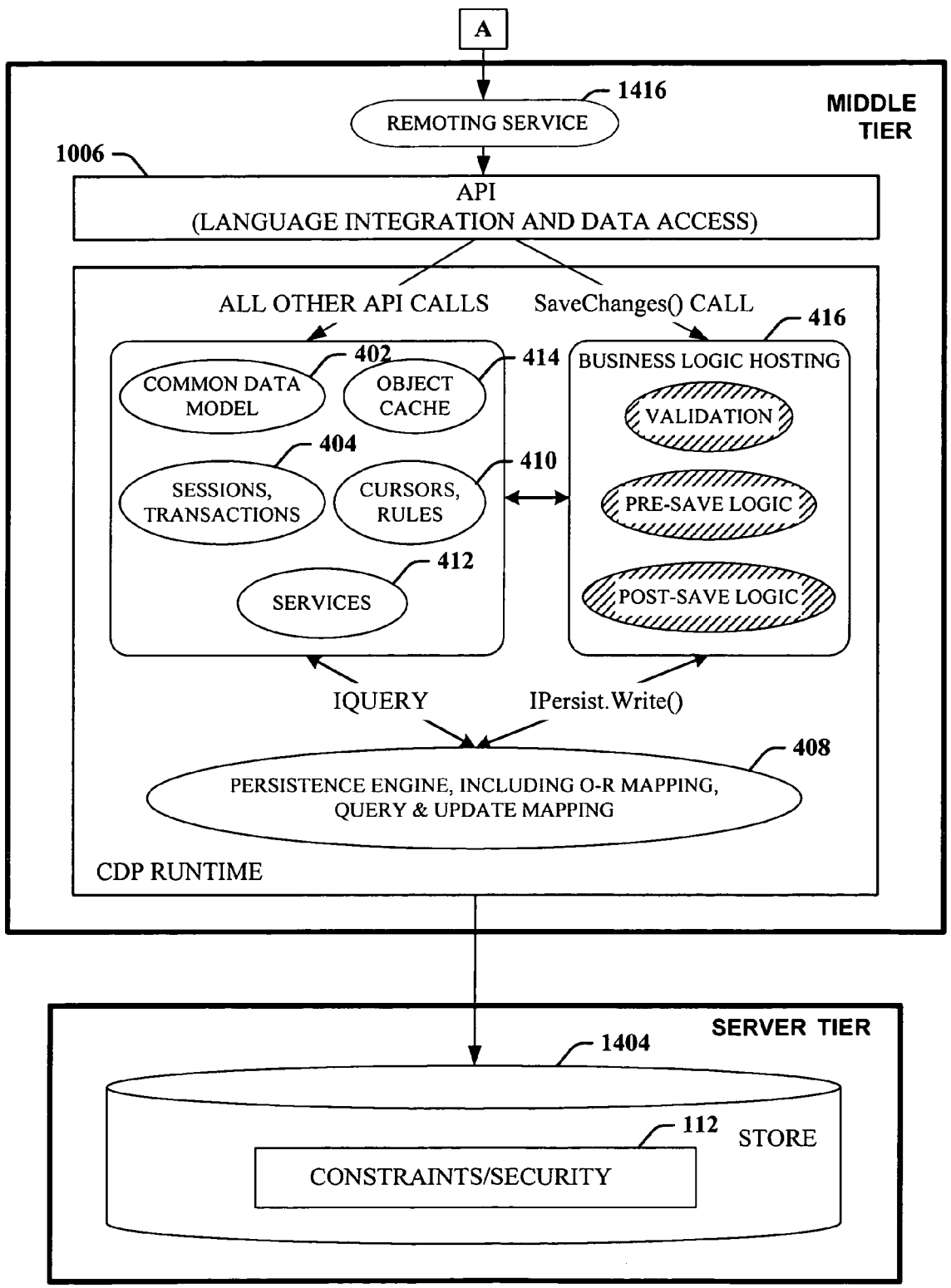
FIG. 17 illustrates a diagram of the application logic running on both the client tier and the middle tier.

FIG. 16 and FIG. 17 illustrate a diagram of the application logic running on both the client tier and the middle tier. The data/control flow through the different components and tiers in response to method calls can be described in more detail utilizing an example. The below example is similar to the example discussed above.

```
1. void AddToCart (String customerId, String productId)
2. {
3.     using (OrderData od = new OrderData( ))
4.     {
5.         ShoppingCart cart = od.ShoppingCarts.Searcher.Filter(
6.             "CustomerId={0}", customerId).GetFirst( );
7.         if( cart == null )
8.             throw new Exception("No shopping cart");
9.         Product product = od.Products.Searcher.Filter(
10.            "ProductId={0}", productId).GetFirst( );
11.        if(product == null) throw new Exception("Missing product);
12.        cart.Products.Add(product);
13.        od.SaveChanges( );
14.    }
15. }
16.
```

As can be seen in the previous examples, Line 3 creates the storage context, Line 5 and Line 9 relate to the query, and Line 12 relates to the update.

Line 13: Flush Changes. Consider the following two possibilities:

1. BL is run both on the client tier and on the mid tier: In this case, the Business Logic Host 416 on the client tier runs the validation and pre-save logic and calls the remoting agent 1414 on the client tier with IPersist.Write (<change vector>). The remoting agent 1414 sends the call to the remoting service 1416 (as seen in FIG. 17) on the Middle Tier. The remoting service 1416 dirties the object cache 414 on the Middle Tier and calls SaveChanges( ). This runs the BL and persistence steps as describe before and returns to the remoting service 1416, wherein the remoting service 1416 then returns to the remoting agent 1414 on the Client Tier, which in turn returns back to the business logic hosting 416. Client side post-save logic may not run by the business logic hosting 416.

2. BL is run only on the mid-tier. In this case, the business logic hosting 416 immediately passes the call to the remoting agent 1414 which in turn sends it to the remote service 1416. Processing happens on the mid-tier as described above.

An advantage of running BL on both tiers is that in case of errors in validation of pre-save logic, they can be trapped on the client tier without having to go through the expense of connecting to the mid-tier.

A seamless offline experience is one of the goals of the database-based file storage system. This can requires a local store 1602 which synchronizes data with the remote store. The local store 1602 can further include constraints/security 1604. In this case, the local store 1602 is on the substantially similar machine, but in a different process (which, in our definition, is still a 2-tier deployment). Since the programming model for 3-tier and 2-tier deployments are symmetrical, it is easy for a service such synchronization to operate between the local store 1602 and the middle tier and keep the data in sync.

Consider Line 2 of the code example shown above. The query resulted in a tier-crossing operation. In this particular example, there was one object returned (the ScheduleEntry object). In general however, this can potentially return a very large result set. Similar comments apply to Line 5 of the previously presented code example. There are two issues that can be considered, and which are pertinent in a 3-tier deployment:

Tier crossing is potentially expensive and hence may not happen implicitly: there is no explicit indication in line 2 that this will result in a tier crossing operation—in other words, "magic" is involved. "Magic" is used here in the sense that something happens without the application knowing about it or having the ability to control its occurrence. Many times, magic is good; in fact, it is the goal of a lot of software to hide the underlying complexity and make things happen "as if by magic". However, in this particular case, long experience has shown that application writers send huge queries willy-nilly, assuming that the code underneath somehow returns a lot of data without choking the network or stressing the server. It is a proven design paradigm that any tier crossing magic be made explicit to the application, thereby encouraging judicious coding practices (is "select * needed from <million-row-table>" or perhaps a WHERE clause can be employed).

Client Side Caching and stateless operation: Notwithstanding attempts at judicious coding, there are times when the application needs to work with a (potentially large) data set; frequently, it knows what this data set is. To optimize data access in such cases, the application should have the ability to run the query, fetch the (potentially large) data set and house it locally in the cache. Further queries/sorting/filtering/changes are made to the local copy of the data. Finally a flush operation writes the changes back to the store. Working on the local cache means that the mid-tier maintains very minimal (or no) state, thus making it more scalable.

The solution is to provide an explicit disconnected model. This is characterized by the following pattern:

1. The application instantiates a local cache in the following way:
   LocalContext lc=new LocalContext( );
2. The local cache will contain the results of one or more queries, specified as the following:
   lc.QueryCollection.Add("<query1>");
   lc.QueryCollection.Add("<query2>");
   // etc.
3. The application "fills" the local context
   lc.Fill( );
4. It works on the local context just like it would with any storage context. For example:
   ScheduleEntry s=
     lc.Entities.FilterByType<ScheduleEntry>( ).Filter(
       "StartTime>@0", new DateTime(
       2004, 10, 29, 9, 0, 0)).GetFirst( );
   s.DisplayName =s.DisplayName+"[important, please come!]";
5. Finally, it sends changes en masse to the store, specified as the following:
   // sc is the StorageContext
   lc.SaveChanges(sc);

Notice how the application can be explicit in when it wants a tier crossing operation to occur—the lc.Fill( ) in step 3—so that there is no magic triggered by innocent code. Notice also that all subsequent operations can occur on the local cache and hence tier crossing is minimized (along with the concomitant maintenance of state on the mid-tier). It is to be appreciated that the model implied by code fragments above are quite similar to the dataset model in ADO.NET. CDP can also provide a disconnected model.

A 2-tier application should not be deployed in a 3-tier environment unless one of the following is true: (a) it uses only the disconnected programming model or (b) it is re-written to use the disconnected programming model.

CDP takes the approach of allowing both connected and disconnected programming models in 3-tier deployments. Applications will be given a guideline that if "they expect to be deployed in a 3-tier environment, then they should use the disconnected cache."

To establish context for the following section that discusses CDP stores, it is noted that the universe of all SQL Server data is partitioned in the following 4-level hierarchy: instance, database, schema, and table. The connectable unit is an instance; a database is a container over which backup, restore, and replication are defined. The combination of a database and a schema provide the context for queries. The CDP uses a 3-level hierarchy: store, schema, and type. A CDP store is the connectable unit; a schema provides context for queries. A given schema can be hosted by multiple CDP stores(e.g., a set of types (CRM schema) can be deployed on two different instances of CDP. If "sameness" is desired, then mechanisms outside of the CDP (replication, bulk-copy) should be used. A given CDP store can have multiple schemas deployed on it—such as an HR schema, Accounting schema, etc.

The naming and discovery is discussed herein. Consider Line 3 of the following code, discussed above.

Using (StorageContext sc=
    new StorageContext@\\corp001\defaultstore))

The following addresses naming of a CDP store and discovery of available stores. A CDP store is defined more clearly. There are two possibilities:

1. It is the actual, physical store—database on an actual server.
2. It is the logical store—the argument to the ctor identifies a logical container of entity instances. In reality, this could be deployed as a farm of replicated physical stores and a front end server works with a load balancer to pick the actual physical store that forms the context for this particular session.

In the CDP model, a storage context identifies a logical store, not a physical store. CDP does not specify how the replication, backup/restore mechanisms work at the level of the physical store.

With respect to a format of actor argument, the connection string is a Uniform Resource Identifier, or URI. Individual frameworks can define an alternative naming format for use by their applications. For example, the UAF might choose to let its applications establish a storage context by specifying an UNC name (e.g., \\server\share). However, it should always be possible to connect to a CDP store by a URI; in other words, any alternative names used by a framework must have a well defined mapping to the corresponding CDP level URI.

CDP does not specify how stores can be discovered. It is expected that applications can use existing mechanisms and repositories (UDDI, for example) for this purposes. In addition, a framework may specify its own methods for discovery.

In this section the additional CDP services that applications can leverage are described. These services include:

Watcher/Notification Services

Synchronization Services

Explicit Cache Services

Utility Operations

This section should be considered descriptive, not architectural.

Watcher/Notification Service. Notifications (aka Watchers) provide the ability to raise asynchronous notifications of changes to entities (data) persisted in the underlying store. An application (or any other component) can use this service to watch for changes in persisted entities. An application will have complete control of what they watch and how often they want to be notified. For example, the Rich Application Views (RAV) Notifications are built using watchers; a client side browsing application can use RAVs to actively react to data changes using these notifications.

The CDP programming model supports a Watcher class that is capable of watching changes in entities. The entity watcher mechanism is sufficient for frameworks and applications to build higher level watcher abstractions. For example, a database-based file storage system can build Item, Item Extension, and Link watcher abstractions on the entity watcher abstraction (e.g., Note that an entity is the most granular piece of data that can be watched).

Synchronization Services. Applications written to the CDP as well as frameworks on top of it will benefit from the following synchronization-related services:

1) Schema annotation for change tracking. Schema designers may designate change unit boundaries for their entity types. Change unit specifications control the functioning of the Change Tracking service.

2) Change Tracking. Largely invisible to applications, it maintains versions for change units during all CDP operations, as well as logs of critical operations such as entity deletions. Change Tracking functions correctly even if legacy applications continue to make changes bypassing the CDP runtime.

3) Change Enumeration. Allows a CDP application to retrieve the set of entities and their change units that have been modified since a certain watermark. The changes are returned as CDP entities and RowSets. A set of services is provided for watermark maintenance in the face of failures, backups and restores, and complex synchronization topologies.

4) Conflict Detection. Allows a CDP application to determine whether a CDP operation (such as an update) will conflict with the operations that have already been performed (again, based on a watermark).

Using this core functionality, frameworks may build additional, higher level synchronization services.

Explicit Cache Services. The explicit cache service in the CDP provides improved performance/scalability of applications, support for disconnected programming model (e.g., Note that a disconnected programming model can be implemented without the benefit of a full featured explicit cache), and support for transient data. The following can be featured in the explicit cache:

Cache different types of data (e.g., entities, unstructured, and XML data)

Different cache access modes (e.g., Read Only, Read Write, Shared, etc.)

Cache coherency with the stored data (e.g., for data stored in SQL Server)

Cache (certain type of data, e.g., session context data) coherency across multiple CDP caches for application failover The programming surface for the explicit cache can expose:

Creation of caches;

population of caches

Persisting caches (of part of data) to the underlying stores

Query and update over cached data

Utility Operations. CDP provide support for variety of administrative and utility operations on entities and collections of entities. A sampling of such operations includes: Copy, Move, Serialize/De-serialize, and Backup/Restore.

Figure 18:
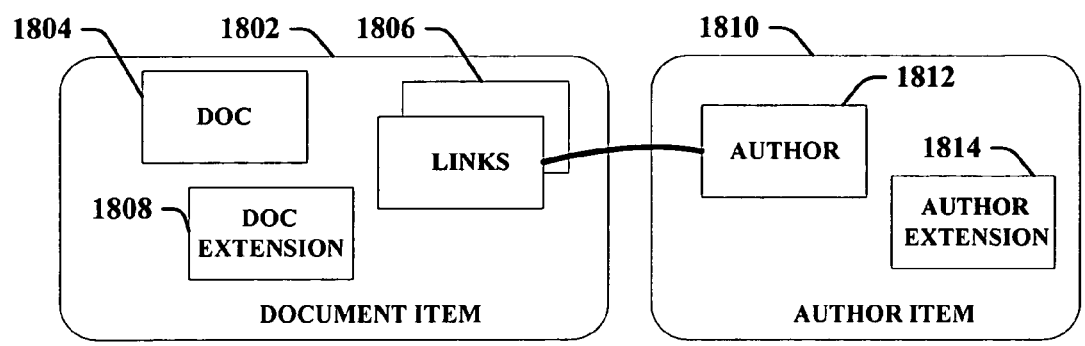
FIG. 18 illustrates modeling items utilizing at least one entity.

Turning now to FIG. 18, the modeling of items utilizing entities is illustrated. The database-based file storage system (e.g., WINFS) implementation encompasses aspects of both CDP and the User Application Framework (UAF). It is noted that the CDP architecture does not mean a re-write of the database-based file storage system, but merely a re-segmentation of the components therein.

In this section, the UAF is defined and then examined as to how the various components of the database-based file storage system can be segmented into UAF and CDP.

The UAF is a CDP framework which is concerned with modeling "user" data. User data refers to the common, everyday data that is pertinent to a typical end user, such as document, photo, music, contact, etc.

To the basic CDP infrastructure, the UAF adds:

Base Item type (and related types)

Actual types for modeling user data

Constraints such as lifetime management, containment, etc.

Things a user can do with items: Move, Copy, Rename, Serialize . . .

Organizational constructs for Items: containers, lists, autolist, annotations, categories End user programming abstractions over items (such as rules authoring)

It is to be appreciated and understood that for application developers, CDP is the UAF programming model.

Specifically, FIG. 18 depicts the notion of an item in UAF and how it is actually derived from several entities. A document item 1802 can be derived from several entities such as, but not limited to, a doc 1804, a plurality of links 1806 and a doc extension 1808. An author item 1810 can be derived from several entities such as, but not limited to, an author 1812, and an author extension 1814.

Figure 19:
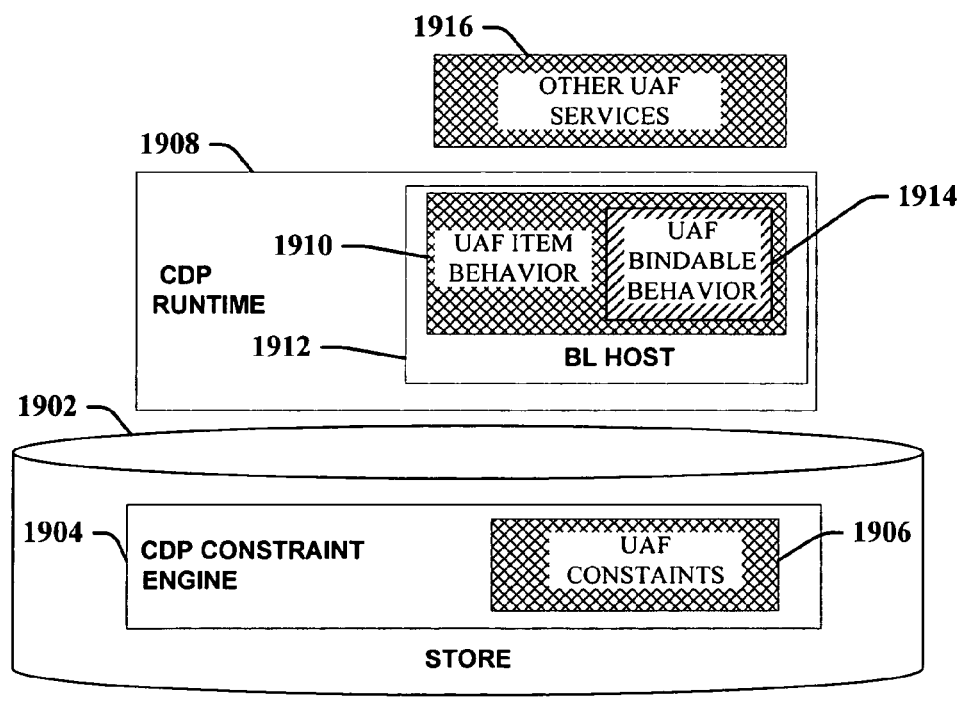
FIG. 19 illustrates extensible mechanisms to implement various functionalities by incorporating the UAF on top of the CDP.

Turning to FIG. 19, extensible mechanisms are illustrated to implement various functionalities by implementing the UAF on top of the CDP. Since the UAF is built on top of CDP, it can utilize CDP extensibility mechanisms to implement additional functionality. The building of the UAF onto the CDP can include various layers and/or components. A store 1902 can include a CDP constraint engine 1904, wherein the CDP constraint engine 1904 includes at least one UAF constraint 1906. A CDP runtime 1908 can include a BL host 1912 which can include a UAF item behavior 1910. The UAF item behavior 1910 can further include a UAF bindable behavior 1914. On top of the CDP runtime 1908, any other UAF services 1916 can exist.

UAF uses CDP's constraint engine to enforce Item semantics (and other type semantics). These are authored using CSDL and the schema generator creates store level constraints for them. Item behaviors, such as Move, Serialize, etc., are implemented using CDP's BL mechanisms. UAF types can have bindable behaviors associated with them. These behaviors are authored by an UAF application developer after the types have been designed and deployed. Other UAF services such as sync, metadata handling, etc., are implemented as regular CDP code. Taken together, these separate pieces of logic, running in various layers of the CDP, form the UAF.

The below description is applicable to partitioning database-based file storage system between CDP and UAF. The following capabilities in the database-based file storage system belong in the CDP layer:

1. O-R mapping—mapping of entities to tables. CDP supports non-prescriptive mappings to handle POCO scenarios and database-based file storage system server scenarios. This also includes update mapping, providing basic CUD operations against entity (and derived) types.
2. OPath query mapping
3. Implementation of Entity and other CDM core types
4. StorageContext and StorageSearcher, along with session and transaction management
5. Session cache, cache flush logic (SaveChanges)
6. Change Tracking
7. Watchers on entity types
8. Cursor services, including RAV
9. Item level security enforcement mechanisms (row level security, security predicates includes in type views)

The following capabilities in a database-based file storage system belong in the UAF layer:

1. Bindable, per-instance behavior
2. Database-based file storage system API metadata (client classes and behaviors expressed as CLR metadata)
3. Item level methods (Copy, move, serialize, rename)
4. Sync, sync scopes, change enumeration
5. Watchers on containers
6. Path table for efficient path name computation and item domains
7. Metadata handlers
8. Database-based file storage system namespace
9. Code for enforcing item integrity (container, item parts, links, file streams, lifetime management, etc.).

Figure 20:
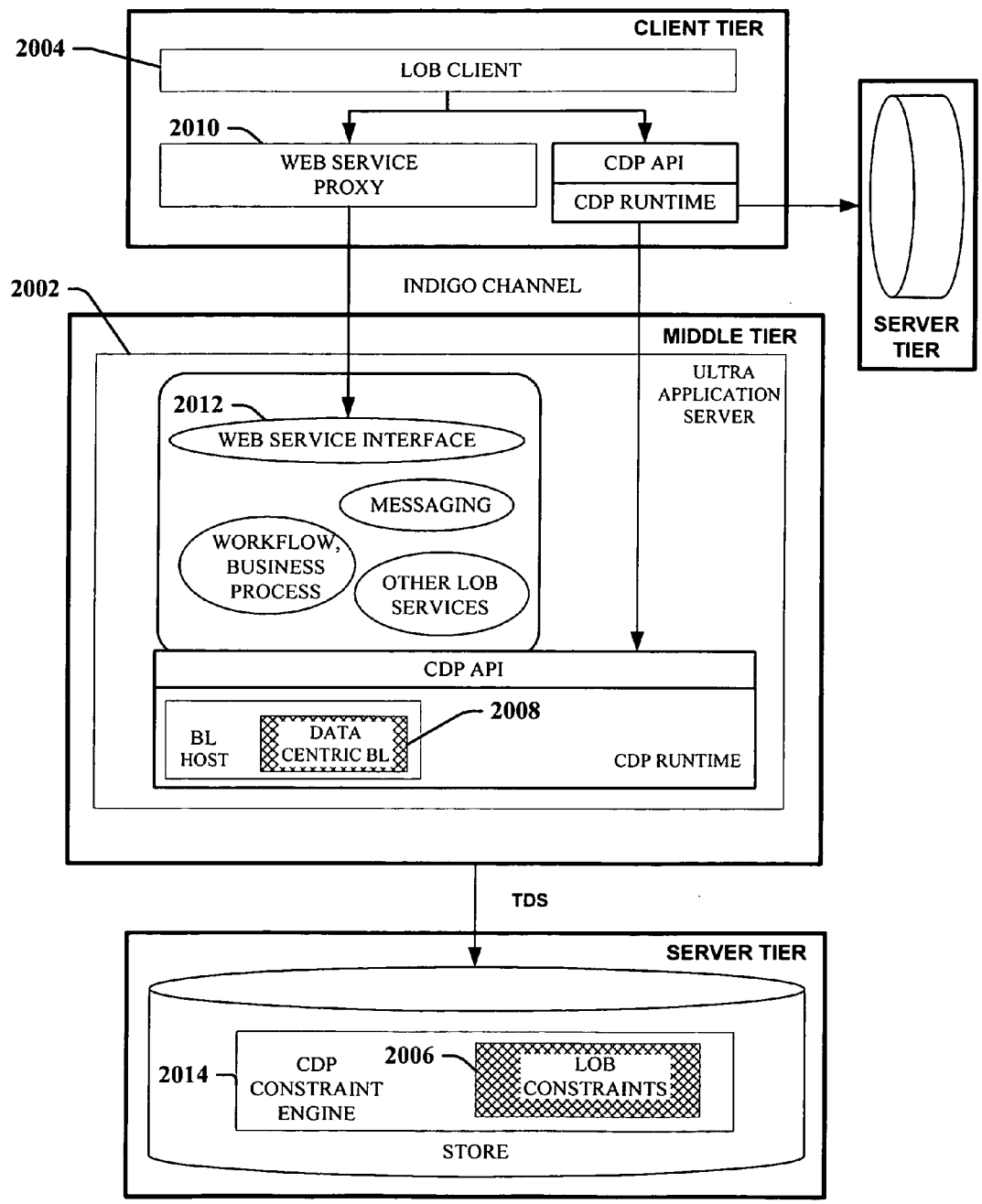
FIG. 20 illustrates an example of a LOB application being implemented over the CDP.

FIG. 20 illustrates an example of a LOB application being implemented over the CDP. Below, the LOB framework requirements are described and how they can be supported by the CDP. A business framework application can be considered a LOB application. The core feature set for business applications is packages as shared business components. Groups of these components manage different business functions such as general ledger in financials to sales force automation services in CRM. The key feature is that these components are faceless, extensible, and can be utilized to serve the needs of multiple markets depending on what level of functionality and complexity is utilized.

The Business Framework (BF) can consist of the Business Solutions Framework and the Business Application Framework. The Business Solutions Framework provides functionality useful to build most business applications. This includes fundamental business data types, such as Money and Quantity; application family-wide business entities, such as customer, business unit, multi-currency information and payment terms; the building blocks for implementing common business patterns, such as Business Transaction and Account; and common business processes patterns, such as for posting a business transaction.

The Solutions Framework is written using the Business Application Framework, which supports writing components by offering rich services for data access, security, user interface, workflow, component programming model and much more. If the business model and rules defined by the Solutions Framework are not appropriate for an application, then it can be bypassed and the developer of the application can directly use the Application Framework.

The Business Application Framework provides a prescriptive programming model that takes the NET Framework and focuses its capabilities toward business applications. While quite extensible, it makes a number of decisions for the application developer that a more general solution would not, increasing productivity and consistency in implementation and structure for all applications in the ecosystem that use it. The Business Application Framework provides a programming model and services for writing web-based, distributed OLTP applications. It may contain no business logic particular to any product and thus is suitable not only for authoring business applications but also any other application fitting its basic profile. It provides a set of services that provide support for data access, messaging (such as the use of SOAP and other protocols), workflow, event brokering, instance activation, diagnostics, configuration, metadata management (reflection), application component security, globalization, a business desk shell and more. The requirements on CDP primarily come from the Business Application Framework portion of BF, particularly in the areas of data access and remoting of data logic.

Entity Persistence (EP), the data access subsystem in the Business Framework supports a rich data model based on a pragmatic object relational mapping framework. It is object relational in that the developer deals with (C#) objects that are mapped to relational rows. The core data modeling concepts are entities and relationships between entities. The Common Data Model (CDM) essentially supports the data modeling requirements of BF data access. MBF EP requires support for the following data access actions:

Entity create, read, update and delete
Ad hoc queries that return a DataSet
Set-based operations that execute in the database BF prescribes an agent/service framework for supporting distributed, service-oriented configurations. Given some piece of business functionality, the agent runs as near to the user of the functionality as possible and the service runs as near to the data as possible. "As close as possible" differs with each deployment scenario and kind of user. The agent/service pattern provides deployment flexibility from 2-tier (client-server) to multi-tier deployment. In such deployments, services provide interfaces that can be invoked across service boundaries; agents typically fetch data close to the client (user), operate it on it, and propagate changes to the service.

In particular, FIG. 20 illustrates how a LOB framework and/or application can utilize the CDP. The framework and application built utilizing the framework can be hosted in an ultra application server 2002 on the middle tier. It can provide standard LOB services such as, but not limited to, work flow, messaging, business processes, etc. in the form of a web services interface to a client application 2004. The ultra application server 2002 can utilize the CDP to author store constraints 2006 (via a CDP constraint engine 2014) and data centric business logic 2008. The client application 2004 can invoke the web services method (e.g., utilizing a web service proxy 2010 and a web service interface 2012) over an Indigo channel. Additionally, it can make use of the CDP on the client tier for its object persistence/data access needs.

The following can be satisfied by the CDP: 1) Session Management; 2) CRUD; 3) Common Data Model (CDM) Support (e.g., Entity Abstraction, Entity Extension); 4) Query (e.g., Ad Hoc, Entity); 5) Running Object Cache (implicit); 6) Concurrency Management (e.g., Optimistic, isolation levels, conflict detection, etc.); 7) Business Logic (e.g., In method, Validation/Defaulting, Property Patterns, Events); 8) Security Extension; 9) Mapping (query, schema) with Providers (e.g., Relational, database-based file storage system); 10) Capability to extend metadata (supports other uses of entity); 11) Set Operations; 12) Capability to call stored procedures; and 13) N-Tier deployments.

BF entity persistence is a natural fit for the CDP. Most of the BF's persistence requirements are fully supported by the CDP. Some of the SOA requirements are also addressed by CDP. However, full support for agent/service model, BF business operations and processes can be built above the CDP as LOB framework. The Business Solutions Framework of MBF is also layered on top of CDP.

Figure 21:
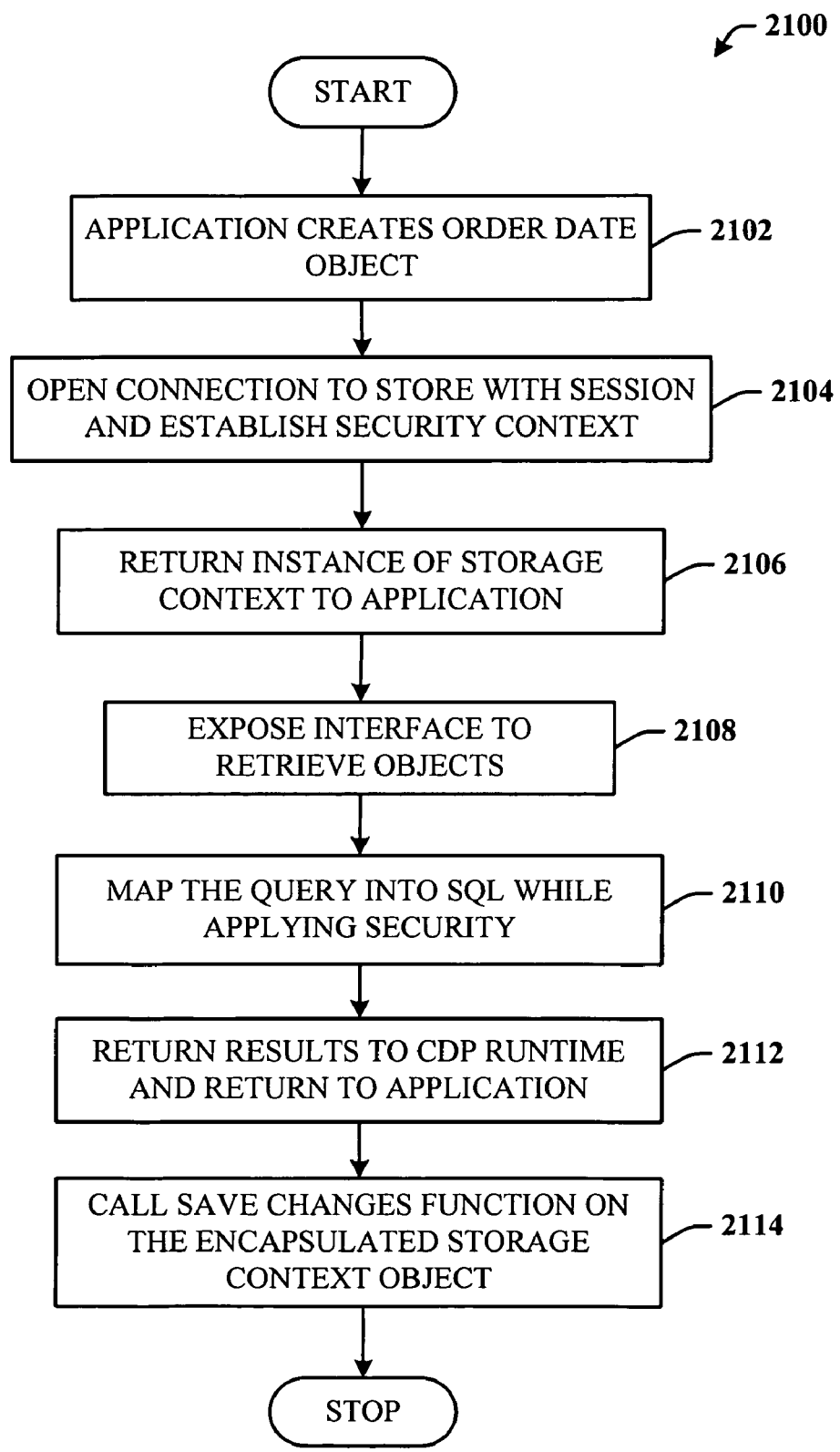
FIG. 21 illustrates a methodology that facilitates managing the flow of data within the various components of CDP.
Figure 22:
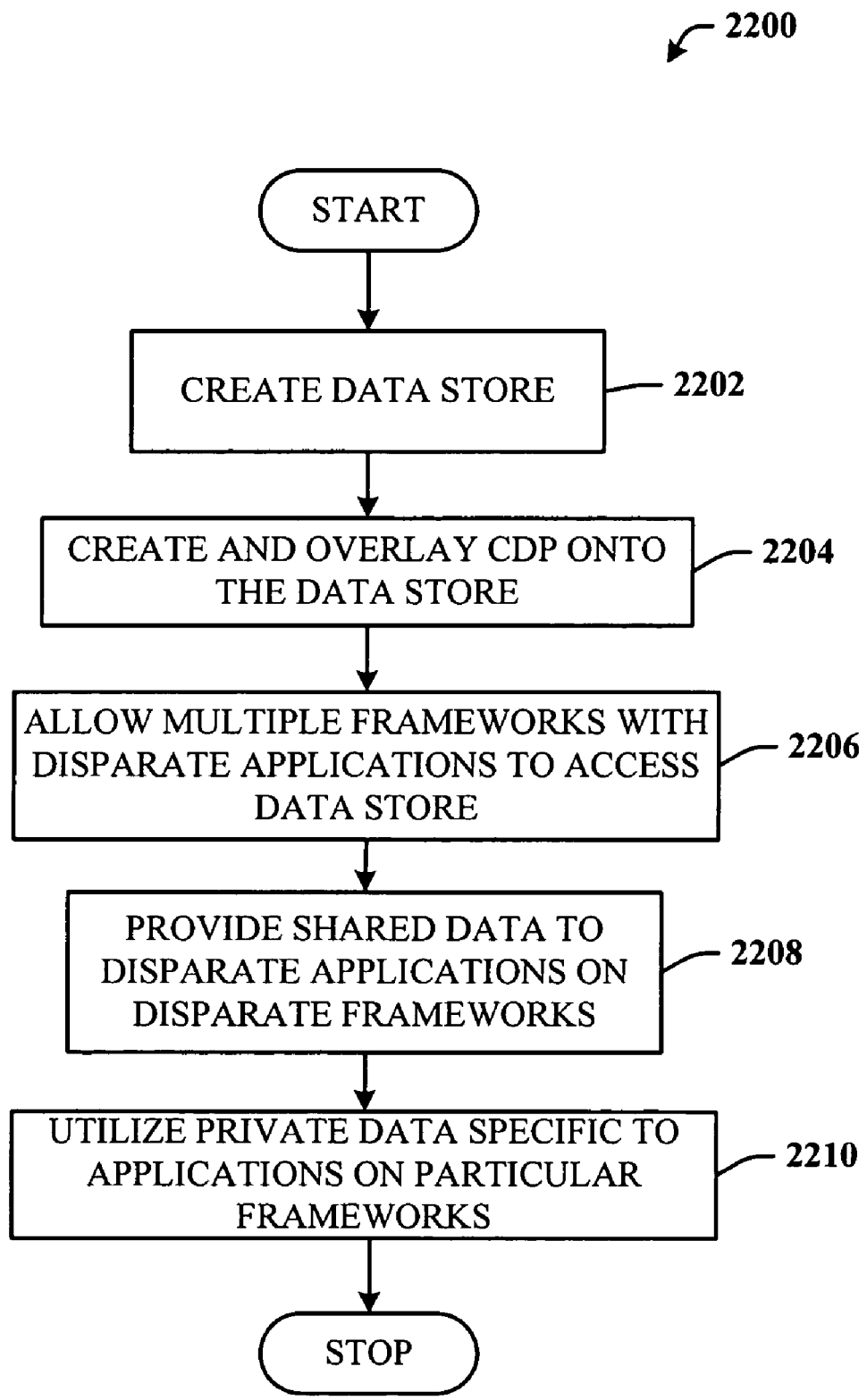
FIG. 22 illustrates a methodology that facilitates deploying a CDP across multiple disparate frameworks, wherein disparate applications can be related to each framework.

FIGS. 21 and 22 illustrate methodologies in accordance with the subject innovation. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the subject innovation. In addition, those skilled in the art will understand and appreciate that the methodologies could alternatively be represented as a series of interrelated states via a state diagram or events.

FIG. 21 illustrates a methodology 2100 that facilitates managing the flow of data within the various components of CDP. At reference numeral 2102, an application creates an order data object. The order data class can represent a table set type that was described in a CDM schema. The order data object creates a storage context object that can be configured as necessary to interact with the store. At reference numeral 2104, a connection to the store is opened by initiating a session and creating a transaction context wherein a security context is established. At reference numeral 2106, an instance of the storage context is returned to the application.

At reference numeral 2108, an interface is exposed to retrieve objects based on a CDM query. At reference numeral 2110, the query is mapped into SQL while applying the security properly. Furthermore, the application/user can see only data that is allowed to be seen. At reference numeral 2112, the results from the query are returned to the CDP runtime and returned to the application. At reference numeral 2114, the save changes function can be called on the encapsulated storage context object in order to flush changes.

FIG. 22 illustrates a methodology that facilitates deploying a CDP across multiple disparate frameworks, wherein disparate applications can be related to each framework. At reference numeral 2202, a data store is created that can store structured, semi-structured, and unstructured data. At reference numeral 2204, a CDP is created and overlaid onto the data store. Continuing at reference numeral 2206, multiple frameworks with associated disparate applications can access the data store. At reference numeral 2208, shared data is provided to disparate applications on disparate frameworks. In other words, data within the data store can be shared among a plurality of disparate applications regardless of the respective framework. At reference numeral 2210, private data can be utilized such that the private data can be specific to a particular application on a particular framework.

Figure 23:
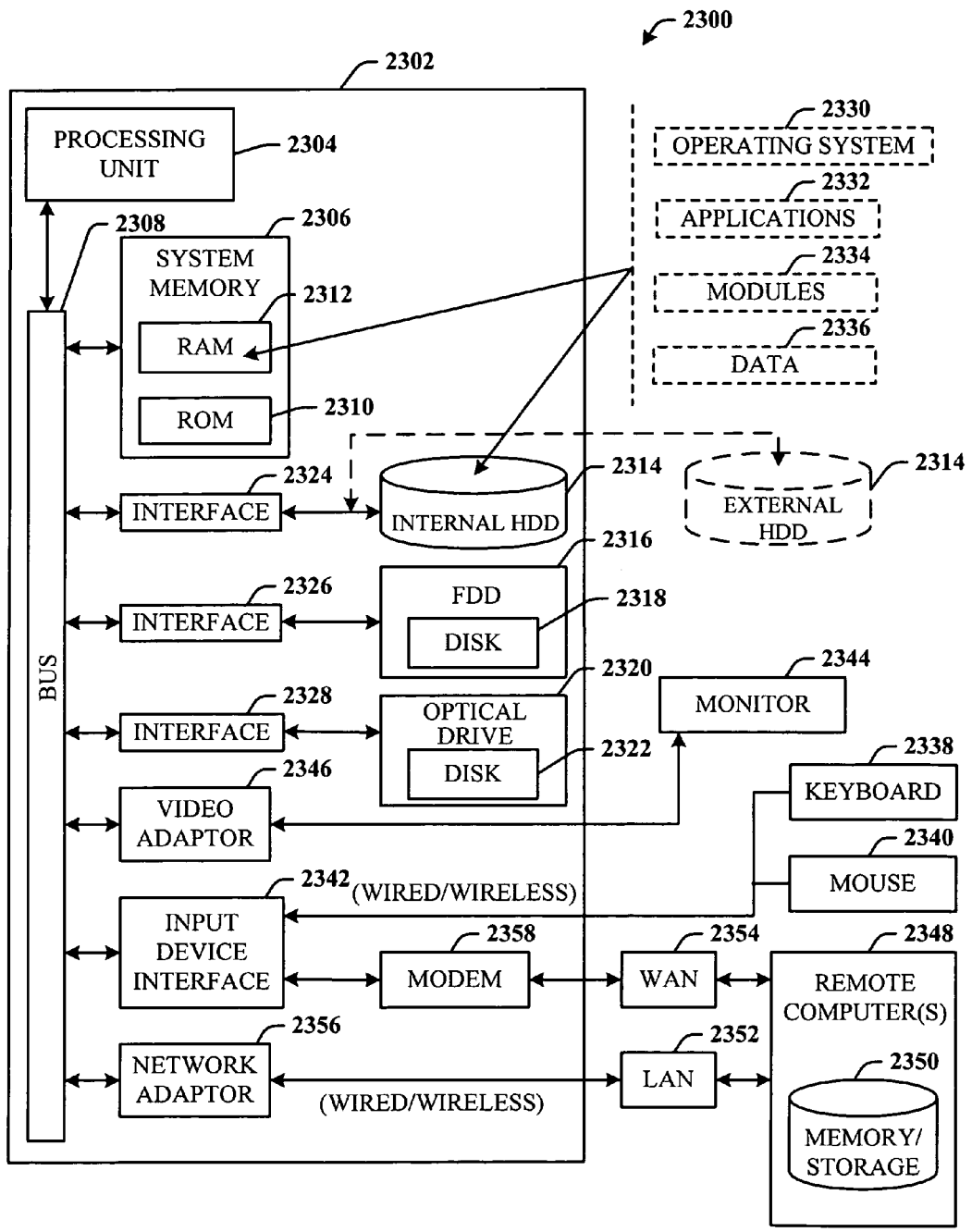
FIG. 23 illustrates a block diagram of a computer operable to execute the disclosed architecture.

Referring now to FIG. 23, there is illustrated a block diagram of a computer operable to execute the disclosed architecture of the CDP and associated components and/or processes. In order to provide additional context for various aspects of the subject architecture, FIG. 23 and the following discussion are intended to provide a brief, general description of a suitable computing environment 2300 in which the various aspects of the innovation can be implemented. While the architecture has been described above in the general context of computer-executable instructions that may run on one or more computers, those skilled in the art will recognize that the architecture also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 23, the exemplary environment 2300 for implementing various aspects includes a computer 2302, the computer 2302 including a processing unit 2304, a system memory 2306 and a system bus 2308. The system bus 2308 couples system components including, but not limited to, the system memory 2306 to the processing unit 2304. The processing unit 2304 can be any of various commercially available processors. Dual microprocessors and other multi-processor architectures may also be employed as the processing unit 2304.

The system bus 2308 can be any of several types of bus structure that may further interconnect to a memory bus (with or without a memory controller), a peripheral bus, and a local bus using any of a variety of commercially available bus architectures. The system memory 2306 includes read-only memory (ROM) 2310 and random access memory (RAM) 2312. A basic input/output system (BIOS) is stored in a non-volatile memory 2310 such as ROM, EPROM, EEPROM, which BIOS contains the basic routines that help to transfer information between elements within the computer 2302, such as during start-up. The RAM 2312 can also include a high-speed RAM such as static RAM for caching data.

The computer 2302 further includes an internal hard disk drive (HDD) 2314 (e.g., EIDE, SATA), which internal hard disk drive 2314 may also be configured for external use in a suitable chassis (not shown), a magnetic floppy disk drive (FDD) 2316, (e.g., to read from or write to a removable diskette 2318) and an optical disk drive 2320, (e.g., reading a CD-ROM disk 2322 or, to read from or write to other high capacity optical media such as the DVD). The hard disk drive 2314, magnetic disk drive 2316 and optical disk drive 2320 can be connected to the system bus 2308 by a hard disk drive interface 2324, a magnetic disk drive interface 2326 and an optical drive interface 2328, respectively. The interface 2324 for external drive implementations includes at least one or both of Universal Serial Bus (USB) and IEEE 1394 interface technologies. Other external drive connection technologies are within contemplation.

The drives and their associated computer-readable media provide non-volatile storage of data, data structures, computer-executable instructions, and so forth. For the computer 2302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the architecture.

A number of program modules can be stored in the drives and RAM 2312, including an operating system 2330, one or more application programs 2332, other program modules 2334 and program data 2336. All or portions of the operating system, applications, modules, and/or data can also be cached in the RAM 2312. It is appreciated that various commercially available operating systems or combinations of operating systems can be implemented with the subject architecture.

A user can enter commands and information into the computer 2302 through one or more wired/wireless input devices, e.g., a keyboard 2338 and a pointing device, such as a mouse 2340. Other input devices (not shown) may include a microphone, an IR remote control, a joystick, a game pad, a stylus pen, touch screen, or the like. These and other input devices are often connected to the processing unit 2304 through an input device interface 2342 that is coupled to the system bus 2308, but can be connected by other interfaces, such as a parallel port, an IEEE 1394 serial port, a game port, a USB port, an IR interface, etc.

A monitor 2344 or other type of display device is also connected to the system bus 2308 via an interface, such as a video adapter 2346. In addition to the monitor 2344, a computer typically includes other peripheral output devices (not shown), such as speakers, printers, etc.

The computer 2302 may operate in a networked environment using logical connections via wired and/or wireless communications to one or more remote computers, such as a remote computer(s) 2348. The remote computer(s) 2348 can be a workstation, a server computer, a router, a personal computer, portable computer, microprocessor-based entertainment appliance, a peer device or other common network node, and typically includes many or all of the elements described relative to the computer 2302, although, for purposes of brevity, only a memory/storage device 2350 is illustrated. The logical connections depicted include wired/wireless connectivity to a local area network (LAN) 2352 and/or larger networks, e.g., a wide area network (WAN) 2354. Such LAN and WAN networking environments are commonplace in offices and companies, and facilitate enterprise-wide computer networks, such as intranets, all of which may connect to a global communications network, e.g., the Internet.

When used in a LAN networking environment, the computer 2302 is connected to the local network 2352 through a wired and/or wireless communication network interface or adapter 2356. The adaptor 2356 may facilitate wired or wireless communication to the LAN 2352, which may also include a wireless access point disposed thereon for communicating with the wireless adaptor 2356.

When used in a WAN networking environment, the computer 2302 can include a modem 2358, or is connected to a communications server on the WAN 2354, or has other means for establishing communications over the WAN 2354, such as by way of the Internet. The modem 2358, which can be internal or external and a wired or wireless device, is connected to the system bus 2308 via the serial port interface 2342. In a networked environment, program modules depicted relative to the computer 2302, or portions thereof, can be stored in the remote memory/storage device 2350. It will be appreciated that the network connections shown are exemplary and other means of establishing a communications link between the computers can be used.

The computer 2302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 24:
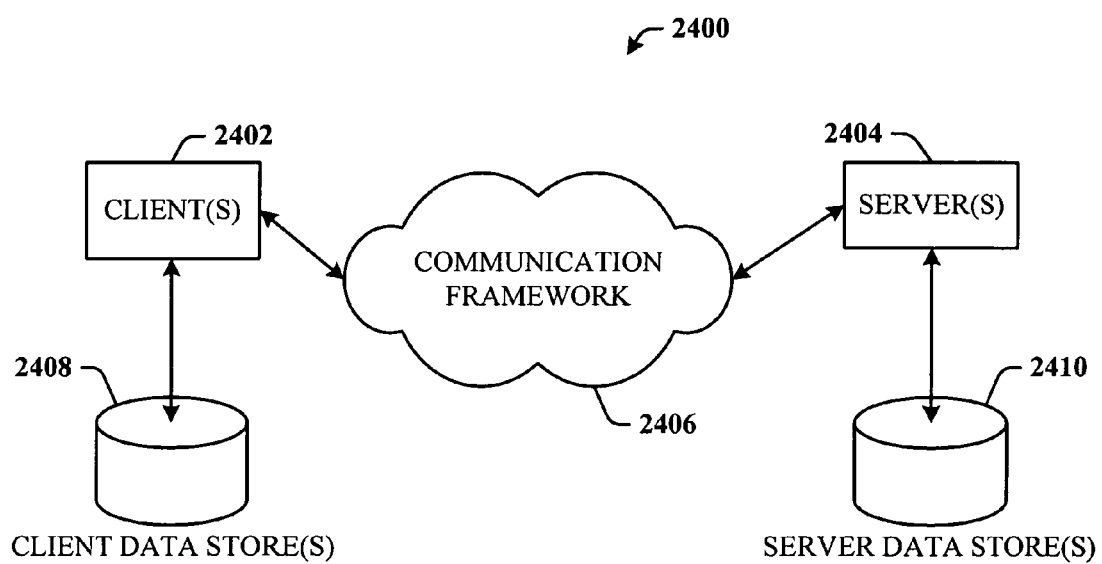
FIG. 24 illustrates a schematic block diagram of an exemplary computing environment in accordance with the subject innovation.

Referring now to FIG. 24, there is illustrated a schematic block diagram of an exemplary computing environment 2400 that can be utilized by the CDP and respective components and/or processes to provide data management. The system 2400 includes one or more client(s) 2402. The client(s) 2402 can be hardware and/or software (e.g., threads, processes, computing devices). The client(s) 2402 can house cookie(s) and/or associated contextual information by employing the architecture, for example.

The system 2400 also includes one or more server(s) 2404. The server(s) 2404 can also be hardware and/or software (e.g., threads, processes, computing devices). The servers 2404 can house threads to perform transformations by employing the architecture, for example. One possible communication between a client 2402 and a server 2404 can be in the form of a data packet adapted to be transmitted between two or more computer processes. The data packet may include a cookie and/or associated contextual information, for example. The system 2400 includes a communication framework 2406 (e.g., a global communication network such as the Internet) that can be employed to facilitate communications between the client(s) 2402 and the server(s) 2404.

Communications can be facilitated via a wired (including optical fiber) and/or wireless technology. The client(s) 2402 are operatively connected to one or more client data store(s) 2408 that can be employed to store information local to the client(s) 2402 (e.g., cookie(s) and/or associated contextual information). Similarly, the server(s) 2404 are operatively connected to one or more server data store(s) 2410 that can be employed to store information local to the servers 2404.

What has been described above includes examples. It is, of course, not possible to describe every conceivable combination of components or methodologies for purposes of describing the subject architecture, but one of ordinary skill in the art may recognize that many further combinations and permutations of the architecture are possible. Accordingly, the architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer system including at least one processor for facilitating data management by providing data services accessible by a plurality of disparate application frameworks allowing uniform access to data, comprising:
   an application program interface (API) that facilitates communicating to applications associated with the disparate application frameworks in the form of at least one of a public class, an interface, and a static helper function;
   a runtime component that interfaces to the API and provides at least one of object-relational mapping, query mapping, and enforcing of constraints;
   a common data model that is used across the plurality of disparate application frameworks, wherein the plurality of disparate application frameworks includes two or more of a line of business framework, an end user framework, a system management framework, a user application framework, a collaboration framework, a business framework, and a personal information framework;
   a data store that models and stores structured, semi-structured and unstructured data types to provide a data service and that includes shared data and private data, the shared data being accessible to disparate applications associated with corresponding application frameworks in the plurality of disparate application frameworks via the common data model and the private data being accessible solely by a particular application associated with a particular application framework in the plurality of disparate application frameworks via the common data model; and
   a persistence engine that invokes object-relational mapping that maps a language class to an underlying tabular representation by invoking at least one of a prescriptive object-relational mapping and a non-prescriptive object-relational mapping.

2. The computer system of claim 1, the common data model facilitates creation of at least one of a domain specific type, a constraint, and a relationship.

3. The computer system of claim 2, the domain specific type is an entity type that is a specification for a grouping of at least one of property and a method, which domain specific type employs at least one of an entity, a table, a table set, and a relationship.

4. The computer system of claim 3, a schema defines at least one of the entity, the relationship, and the table set such that a namespace is associated therewith.

5. The computer system of claim 2, the common data model includes a query language over a type system defined by the common data model,
   wherein the query language allows rich queries against an object structure that provides a strongly typed, object-based abstraction against stored data.

6. The computer system of claim 5, the query language is at least one of Opath and OSQL (object-oriented structured query language).

7. The computer system of claim 1, further comprising a constraint/security engine that facilitates declarative authoring of constraints, and controls access to at least one entity of the data platform.

8. The computer system of claim 1, the mapping is from an application space to the common data model, and independent from the common data model to the data store.

9. The computer system of claim 1, the application is at least one of an end-user application, a knowledge worker application, a line-of-business application, a web application, a contact management application, document management application, a collaboration application, an email application, a customer relationship management application, an enterprise resource planning application, and a system management application.

10. The computer system of claim 1, the runtime component provides management of an entity state which includes at least one of an identification mapping, an object change tracking, and an original value.

11. The computer system of claim 1, the data platform and respective components are tier-agnostic and can exist in at least one of a client tier, a middle tier, a server tier, and a web service tier.

12. The computer system of claim 1, further comprising at least one of a rule service, a change tracking service, a conflict detection service, an eventing service and a notification service.

13. A computer-implemented method of managing data between a data store and multiple applications of multiple disparate application frameworks, comprising:

overlaying a data platform on the data store that models and stores structured, semi-structured, and unstructured data types to provide a data service;

overlaying the plurality of disparate application frameworks onto the data platform to allow at least one application within each application framework to access the data store, wherein the plurality of disparate application frameworks includes two or more of a line of business framework, an end user framework, a system management framework, a user application framework, a collaboration framework, a business framework, and a personal information framework;

providing an application programming interface (API) that enables communication to the applications in the form of at least one of a public class, an interface, and a static helper function;

providing in the data platform at least one of an object-relational mapping, a query mapping, and an enforcing of constraints;

providing in the data platform a common data model that is used by the plurality of the disparate application frameworks to access the data store, wherein shared data stored in the data store is made accessible to disparate applications associated with corresponding application frameworks in the plurality of disparate application frameworks and private data stored in the data store is made accessible solely to a particular application associated with a particular application framework in the plurality of disparate application frameworks; and providing a persistence engine that invokes object-relational mapping that maps a language class to an underlying tabular representation by invoking at least one of a prescriptive object-relational mapping and a non-prescriptive object-relational mapping;

wherein at least one of the foregoing steps is performed by a computer.

14. The method of claim 13, further comprising:
creating an object;
opening a connection to the data store with a session and establishing a security context;
returning an instance of a storage context to an application;
exposing an interface to retrieve objects;
mapping a query into SQL while applying security;
returning a result to a data platform runtime and the application; and
saving the changes on the encapsulated storage context object.

15. A computer system including at least one processor that facilitates managing data by providing data services accessible by a plurality of disparate application frameworks allowing uniform access to data, comprising:

application programming interface (API) means for communicating to applications associated with the disparate application frameworks in the form of at least one of a public class, an interface, and a static helper function;

means for providing at least one of object-relational mapping, query mapping, and enforcing of constraints that interfaces to the API means;

means for providing a common data model that is used by a plurality of disparate application frameworks, wherein the plurality of disparate application frameworks includes a user application framework and a line of business (LOB) application framework; and means for providing a data store that models and stores structured, semi-structured, and unstructured data types to provide a data service and that includes shared data and private data, the shared data being accessible to disparate applications associated with corresponding application frameworks in the plurality of disparate application frameworks via the common data model and the private data being accessible solely by a particular application associated with a particular application framework in the plurality of disparate application frameworks via the common data model;

wherein the means for providing at least one of object-relational mapping, query mapping, and enforcing of constraints comprises a persistence engine that invokes an object-relational mapping that maps a language class to an underlying tabular representation by invoking at least one of a prescriptive object-relational mapping and a non-prescriptive object-relational mapping.

16. The computer system of claim 15, further comprising a constraint/security engine that facilitates declarative authoring of constraints, and controls access to at least one entity of the computer system.

\* \* \* \* \*